United States Patent [19]
Yamakawa et al.

[11] Patent Number: 6,131,137
[45] Date of Patent: Oct. 10, 2000

[54] DRIVE CONTROL UNIT AND OPTICAL MEMORY APPARATUS

[75] Inventors: Teruji Yamakawa; Kiyomi Imamura; Masaoki Ohtsuka, all of Kanagawa, Japan

[73] Assignee: Fujitsu Limited, Kawasaki, Japan

[21] Appl. No.: 09/030,246

[22] Filed: Feb. 25, 1998

[30] Foreign Application Priority Data

Sep. 8, 1997 [JP] Japan .................................. 9-243182

[51] Int. Cl.[7] ................................................. G06F 9/48
[52] U.S. Cl. ........................................ 710/260; 710/48
[58] Field of Search .................................. 710/260, 262, 710/263, 266, 48, 49

[56] References Cited

U.S. PATENT DOCUMENTS

| | | | |
|---|---|---|---|
| 5,588,125 | 12/1996 | Bennett | 710/262 |
| 5,896,540 | 4/1999 | Asano et al. | 710/262 |
| 5,983,330 | 11/1999 | Miwa et al. | 710/262 |

FOREIGN PATENT DOCUMENTS

| | | |
|---|---|---|
| 61-279963 | 12/1986 | Japan . |
| 62-219030 | 9/1987 | Japan . |
| 5-40725 | 2/1993 | Japan . |

*Primary Examiner*—Glenn A. Auve
*Attorney, Agent, or Firm*—Greer, Burns & Crain, Ltd.

[57] ABSTRACT

An optical memory apparatus, in which an ODC section generates an interruption according to an instruction from an upper system, an ODD section provides drive controls over a memory apparatus according to an interruption by the ODC, and an MPU actuates a timer when an interruption by the ODC is successively generated, invalidates the interruption when a measure time from a time point of generation of a previous interruption until a time point of generation of the last interruption is not over a prespecified period of time, and validates, on the other hand, the interruption when the time measured by the timer is over the prespecified period of time.

21 Claims, 17 Drawing Sheets

PRIOR ART

DRIVE CONTROL UNIT AND OPTICAL MEMORY APPARATUS

FIELD OF THE INVENTION

The present invention relates to a drive control unit and an optical memory apparatus for providing controls for a driving operation from an upper host computer over a storage medium such as an optical disk unit having an optical disk drive mechanism and a circuit board with a control circuit mounted thereon.

BACKGROUND OF THE INVENTION

An optical disk unit has been used as a memory apparatus in a computer system. The optical disk unit has been required to increase memory capacity as well as to minimize the unit. For this reason, in any optical disk unit, the entire unit has been minimized by reducing circuit components to be packaged on the board or by making smaller an area for each component to be packaged thereon, and general controls have been provided by a single processor.

FIG. 13 is a block diagram showing a memory apparatus based on the conventional technology as a whole, and FIG. 14 is a block diagram showing circuits based on the conventional technology. The diagrams shown in FIG. 13 and FIG. 14 assume a magneto-optic disk unit as an optical disk unit respectively. As shown in FIG. 13, a control circuit for the magneto-optic disk unit has the configuration as described below. Namely, a micro-processor (MPU) 61 provides main controls over the unit. A random access memory (RAM) 65 is a memory used for processing by a MPU 61.

A read-only memory (ROM) 66 is a memory for storing therein a control program executed by the MPU 61. An optical disk controller/optical disk driver (described as ODC/ODD hereinafter) 63 is firmware, provides interface controls for a host computer which is not shown in the figure, and comprises an ODC section for encoding/decoding data and an ODD section for providing drive controls. A random access memory (RAM) 67 is used as a buffer memory for read data/write data operations.

A digital signal processor (DSP) 64 provides servo controls over an optical head of an optical disk drive mechanism. A control logic circuit 62 is a logic circuit group for executing digital signal transaction with the optical head or the like for the optical disk drive mechanism. The control logic circuit 62 prepares a timing gate for data transaction between the processor 61 and optical head. These digital circuits 61, 65, 63, 64 and 66 are connected to each other through a shared address/data bus line 68. An analog circuit is provided in addition to those digital circuits. The analog circuit comprises a read circuit 69, a write circuit 71, a driving circuit 72 or the like.

The read circuit 69 amplifies output from an optical detector 90 for the optical head, and then generates a waveform. This generated pulse is output to the ODC/ODD 63 as read data. The write circuit 71 drives a laser diode 91 of the optical head for emitting pulses therefrom with specified power according to write data. With this operation, data is written in an opticaldisk. The driving circuit 72 drives a driving mechanism 92 for the optical head according to a servo signal from the DSP 64. The driving mechanism 92 for the optical head includes a focus actuator for the optical head, a track actuator therefor, and a motor for moving the optical head or the like. A servo AGC circuit 81 prepares a focus error signal as well as a track error signal from output detected by the optical detector 90 for the optical head, and outputs the signals to the DSP 64.

Next description is made with reference to the block diagram of circuits shown in FIG. 14. As shown in FIG. 14, the MPU 61 and control logic circuit 62 are formed in a single chip. Then, a clock source 73 is connected to this single chip LSI. The RAM 67 and a terminal resistor 74 of the host interface are connected to the ODC/ODD 63. The RAM 65 and ROM 66 are connected to the MPU 61 through the address/data bus line 68.

Provided in an optical head 80 are the write LSI 71 and the preamp/servo AGC circuit 81. The write LSI 71 provides light-emission controls for reading or writing over the laser diode (light-emitting element) 91. The write LSI 71 is connected to the control logic circuit 62 and provides light-emission controls for reading or writing over the laser diode 91 according to instructions from the MPU 61.

The preamp/servo AGC circuit 81 converts a current detected by the optical detector 90 for the optical head 80 to a voltage, and then prepares, a regenerative signal, a focus error signal and a track error signal. The focus error signal and track error signal are output to the DSP 64. The read circuit 69 generates a waveform of a regenerative signal for the preamp/servo AGC circuit 81, and outputs the pulsed read data to the ODC/ODD 63. It should be noted that ananalogs switch 69-1 and a reversing circuit 69-2 are provided in the read circuit 69.

The analog LSI 75 is formed by integrating analog circuits such as an operational amplifier and a comparator used in the unit. The analog LSI 75 executes operations for filterin and amplifying a focus error signal and a track error signal, or the like. An amplifier 76 is an operational amplifier for an analog filter. This amplifier 76 executes an operation for filtering output from the preamp/servo AGC circuit 81. An amplifier 77 is also an operational amplifier for an analog filter, and executes an operation for further filtering output from the analog LSI 75.

Provided in the optical disk drive mechanism 82 is a lens-position detector 93 for detecting a position of a lens for the optical head 80. An AGC amplifier 70 is a circuit for executing current/voltage conversion for a sensor signal from the detector 93. A focus actuator 92-1, a track actuator 92-2 and a voice coil motor 92-3 are provided in the optical disk drive mechanism 82 as a driving mechanism for the optical head 80.

The focus actuator 92-1 drives a lens for the optical head 80 in the focus direction and adjusts a focus position of an optical beam. The track actuator 92-2 drives a lens for the optical head 80 in the transverse direction of a track and finely adjusts a track position of an optical beam. The voice coil motor 92-3 moves the optical head 80 in the direction crossing the track on the optical disk.

The DSP 64 executes processing for servo controls in various modes according to a focus error signal and a track error signal each from the analog LSI 75 as well as to a lens-position detection signal from the AGC amplifier 70. Namely, th DSP 64 provides focus servo controls, track servo controls, and seek controls.

The DSP 64 has a group comprising A/D converters each for converting from analog to digital a focus error signal, a track error signal, and a lens-position detection signal. Then the DSP 64 computes servo control values (focus servo control value, track servo control value, and seek servo control value) according to those digitally converted signals. The DSP 64 also has a group comprising D/A converters each for converting each of the servo control values to an analog servo control volume. The driving circuit 72 for servo as well as seek controls is connected to the DSP 64.

This driving circuit 72 comprises a focus driver circuit 72-1 for driving the focus actuator 92-1 according to a focus servo control volume, a track driver circuit 72-2 for driving the track actuator 92-2 according to a track servo control volume, and a VCM driver circuit 72-3 for driving the voice coil motor 92-3 according to a seek servo control volume.

Further provided in the mechanism 82 are an eject motor 93-1 for ejecting an optical disk cartridge to the outside and a spindle motor 93-2 for rotating an optical disk.

An eject driver circuit 78-1 drives the eject motor 93-1 according to instructions from the MPU 61 via the control logic circuit 62. A spindle driver circuit 78-2 drives the spindle motor 93-2 according to instructions from the MPU 61 via the control logic circuit 62.

A coil 94 for a bias magnetic field for loading a magnetic field to the optical disk is further provided therein. A bias driver circuit 79 drives the coil 94 for a bias magnetic field according to instructions from the MPU 61 via the control logic circuit 62. A bias generates a magnetic field of a positive and a negative polarity when a specified current is flown to the coil 94 for a bias magnetic field in the positive and negative directions.

An amplifier 79-1 is an operational amplifier for detecting a bias driving current. A comparator 79-2 is a component for setting a bias driving current value. A dip switch 175 is a switch for setting an address from the outside. A flip flop 176 is a component for maintaining a set value of the dip switch 75. These dip switch 175 and flip flop 176 are provided for an SCSI interface.

FIG. 15 and FIG. 16 are views each showing packaged circuits based on the conventional technology respectively and FIG. 17 is a view for configuration of the memory apparatus based on the conventional technology. FIG. 15 is a top plan view of the circuit board 86, and FIG. 16 is a bottom view thereof. To package each IC circuit as described above, each IC and LSI are packaged, as shown in FIG. 15, on the top surface of the single unit of circuit board 86 based on the conventional technology.

Also packaged on the bottom surface of the circuit board 86 is, as shown in FIG. 16, rest of the circuits such as an IC, and LSIs 65, 66, 67-2. It should be noted that the reference numerals 84-1 to 84-5 shown in FIG. 15 and FIG. 16 indicate connectors respectively each of which is provided for connection to the optical disk drive mechanism. The reference numeral 85 indicates a connector for interface which comprises a SCSI interface connector.

Areas 87, 88 and 89 within a region indicated by dotted lines on the circuit board 86 shown in FIG. 16 are areas each in which an address/data bus line or the like is wired. There are some components on the board such as the bias coil 94 for optical disk drive mechanisms 80, 82 which is high in height, so that there are some areas having a height not sufficient to package components thereon. In those areas, because the components can not be packaged as described above, the address/data bus lines or the like are provided.

As shown in FIG. 17, the circuit board 86 is fixed on the optical disk drive mechanism 82 with screws or the like. The circuit board 86 is fixed to the optical disk drive mechanism 82 with the bottom surface of the board having a comparatively smaller number of packaged components opposite thereto.

In the conventional technology described above, as a control logic circuit 62 for providing drive controls and an ODC/ODD 63 for executing upper interface with a host computer operate under controls by a single unit of MPU for reduction of a circuit scale, when a command is successively issued from the host computer while the control logic circuit 62 is providing drive controls (during seek operation or the like), an interruption by the command to the MPU 61 is generated and the ODC/ODD 63 starts its operation according to the command.

At that point of time, if the host computer operates more slowly than the magneto-optic disk unit, the processing for controls is returned to the control logic circuit 62 after the ODC/ODD 63 finishes the processing for the command and the driving operation can be continued, but there has been a tendency in recent years that a clock frequency of a host computer is becoming higher, which makes the operational speed of the magneto-optic disk unit be far behind as compared to that of the host computer.

As described above, when the operation of the host computer is faster than that of the magneto-optic disk unit, the next command is issued from the host computer at the very moment when the processing for controls is returned to the control logic circuit 62 after the ODC/ODD 63 finishes the processing for the command, so that the processing for controls shifts back again to the ODC/ODD 63 according to the is sued command. For this reason, there has been the possibility hat the driving operation is abnormally terminated because the processing for drive controls by the control logic circuit 62 is impossible to continue due to successive interruption.

It should be noted that there has been also the possibility that this type of abnormal termination in the driving operation may occur when an optical disk as a medium is loaded or when an operation for writing in the medium is executed via a data buffer.

SUMMARY OF THE INVENTION

It is a first object of the present invention to provide a drive control unit which can prevent an operation for driving a medium (optical disk or the like) from being abnormally terminated even if there is an interruption when synchronizing to a command issued from an upper system such as a host computer.

It is a second object of the present invention to provide a drive control unit which can prevent an operation for driving a medium (optical disk or the like) from being abnormally terminated by executing the smooth processing for inserting (loading) a recording medium even if there is an interruption when not synchronizing to a command issued from an upper system such as a host computer in inserting the medium (optical disk or the like) thereto.

It is a third object of the present invention to provide an optical memory apparatus which can prevent an operation for driving a medium (optical disk or the like) from generation of abnormal termination thereof even if there is an interruption when synchronizing to a command issued from an upper system such as a host computer.

With the present invention, time from generation of a previous interruption from an upper system is measured and the next interruption is invalidated in the processing by a processor until the measured time is over a prespecified period of time, so that the driving operation can further be continued until the next interruption is validated. With those operations, it is possible to prevent generation of abnormal termination of a driving operation or the like.

With the present invention, time from generation of a previous interruption from an upper system is measured, and the next interruption is invalidated by hardware (interruption control unit) until the measured time is over a prespecified period of time, so that the driving operation can further be continued until the next interruption is validated. With those operations, it is possible to prevent generation of abnormal termination of a driving operation or the like.

With the present invention, the prespecified period of time may arbitrarily be specified from an upper system, and in this case, it is possible to insure a minimum period of time required for realizing a smooth driving operation.

With the present invention, the prespecified period of time may variably be specified according to any one of a recording density in a medium, a head position, and contents of an instruction from the upper system, or to combination of two or more thereof, and in this case, it is possible to insure a driving operation with higher reliability.

With the present invention, processing steps from generation of a previous interruption from an upper system are counted, and the next interruption is invalidated by hardware (interruption control unit) until the number of counted steps is over a specified number of steps, so that the driving operation can further be continued until the next interruption is validated. With those operations, it is possible to prevent generation of abnormal termination of a driving operation or the like.

With the present invention, the specified number of steps may arbitrarily be specified from an upper system, and it is possible to insure a minimum period of time required for realizing a smooth driving operation.

With the present invention, the specified number of steps may variably be specified according to any one of a recording density in a medium, a head position, contents of an instruction from the upper system, and a command operation, or to combination of two or more thereof, and it is possible to more dynamically insure a driving operation.

With the present invention, an interruption from an upper system is invalidated, after the prespecified period is over, according to a difference between a transfer rate by the upper system and a transfer rate by the device as well as to a data volume in the data buffer, so that a driving operation is preferentially executed excluding a case where an interruption is permitted for caching a specified volume of data to the data buffer. With those operations, it is possible to execute a smooth writing operation in a medium in a memory apparatus.

With the present invention, the period may arbitrarily be specified from an upper system, and in this case, it is possible to insure a minimum period of time required for realizing a smooth driving operation.

With the present invention, the period may variable specified according to any one of a recording density in a medium, a head position, contents of an instruction from the upper system, and a command operation, or to combination of two or more thereof, and in this case it is possible to more dynamically insure a driving operation and a transfer rate.

With the present invention, when a medium is inserted into the memory apparatus, time from generation of a previous interruption from the upper system is measured, and the next interruption is invalidated by the processor until the measured time is over a prespecified period of time, so that a driving operation can further be continued until the next interruption is validated. With those operations, it is possible to prevent generation of abnormal termination of the driving operation or the like even when not synchronizing to command with the upper system such as a host computer.

With the present invention, when a medium is inserted into the memory apparatus, time from generation of a previous interruption from an upper system is measured, and the next interruption is invalidated by the hardware (interruption control unit) until the measured time is over a prespecified period of time, so that the driving operation can further be continued until the next interruption is validated. With those operations, it is possible to prevent generation of abnormal termination of the driving operation or the like even when not synchronizing to a command from an upper system such as a host computer.

With the present invention, the prespecified period of time may arbitrarily be specified from an upper system, and in this case, it is possible to insure a minimum period of time required for realizing a smooth driving operation.

With the present invention, the prespecified period of time may variably be specified according to any one of a recording density in the medium, a head position, and contents of an instruction from the upper system, or to combination of two or more thereof, and in this case, it is possible to more dynamically insure a driving operation.

With the present invention, processing steps from generation of a previous interruption from the upper system are counted, and the next interruption is invalidated by hardware (interruption control unit) until the number of counted steps is over a specified number of steps, so that the driving operation can further be continued until the next interruption is validated. With those operations, it is possible to prevent generation of abnormal termination of the driving operation or the like even when not synchronizing to a command from an upper system such as a host computer.

With the present invention, the specified number of steps may arbitrarily be specified from an upper system, and in this case, it is possible to insure a minimum period of time required for realizing a smooth driving operation.

With the present invention, the specified number of steps may variably be specified according to any one of a recording density in a medium, a head position, contents of an instruction from the upper system, and a command operation, or to combination of two or more thereof, and in this case, it is possible to more dynamically insure a driving operation.

With the present invention, the next interruption from an ODC is invalidated by a MPU until the time from generation of a previous interruption from the upper system is over a prespecified period of time, so that the driving operation by a ODD can further be proceeded until the next interruption from the ODC is validated. With those operations, it is possible to prevent generation of abnormal termination of the driving operation or the like.

Other objects and features of this invention will become understood from the following description with reference to the accompanying drawings.

DESCRIPTION OF THE PREFERRED EMBODIMENTS

Detailed description is made for preferred embodiments of the drive control unit according to the present invention with reference to the related drawings.

Figure 1:
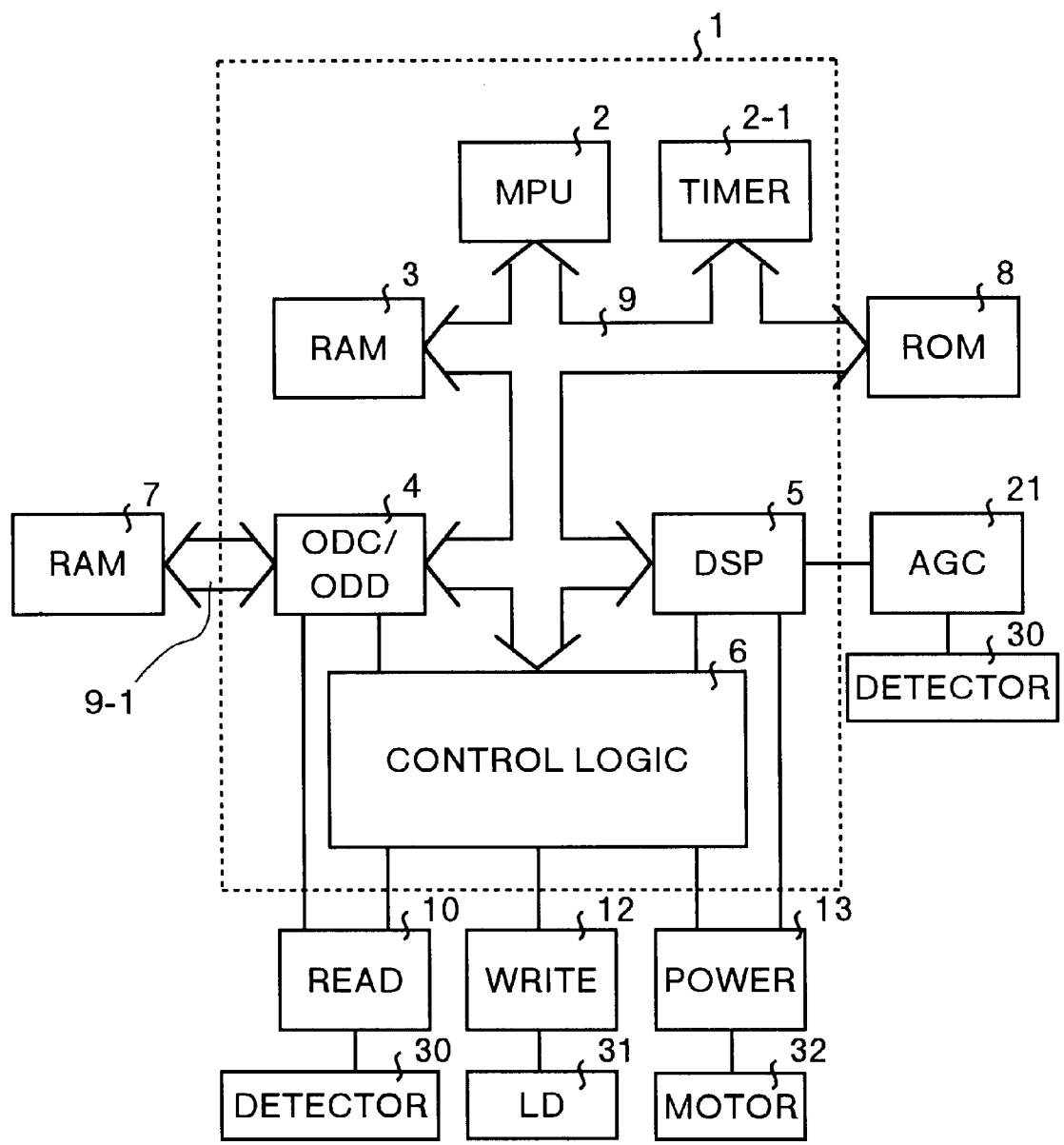
FIG. 1 is a block diagram functionally showing a memory apparatus according to Embodiment 1 of the present invention.
Figure 2:
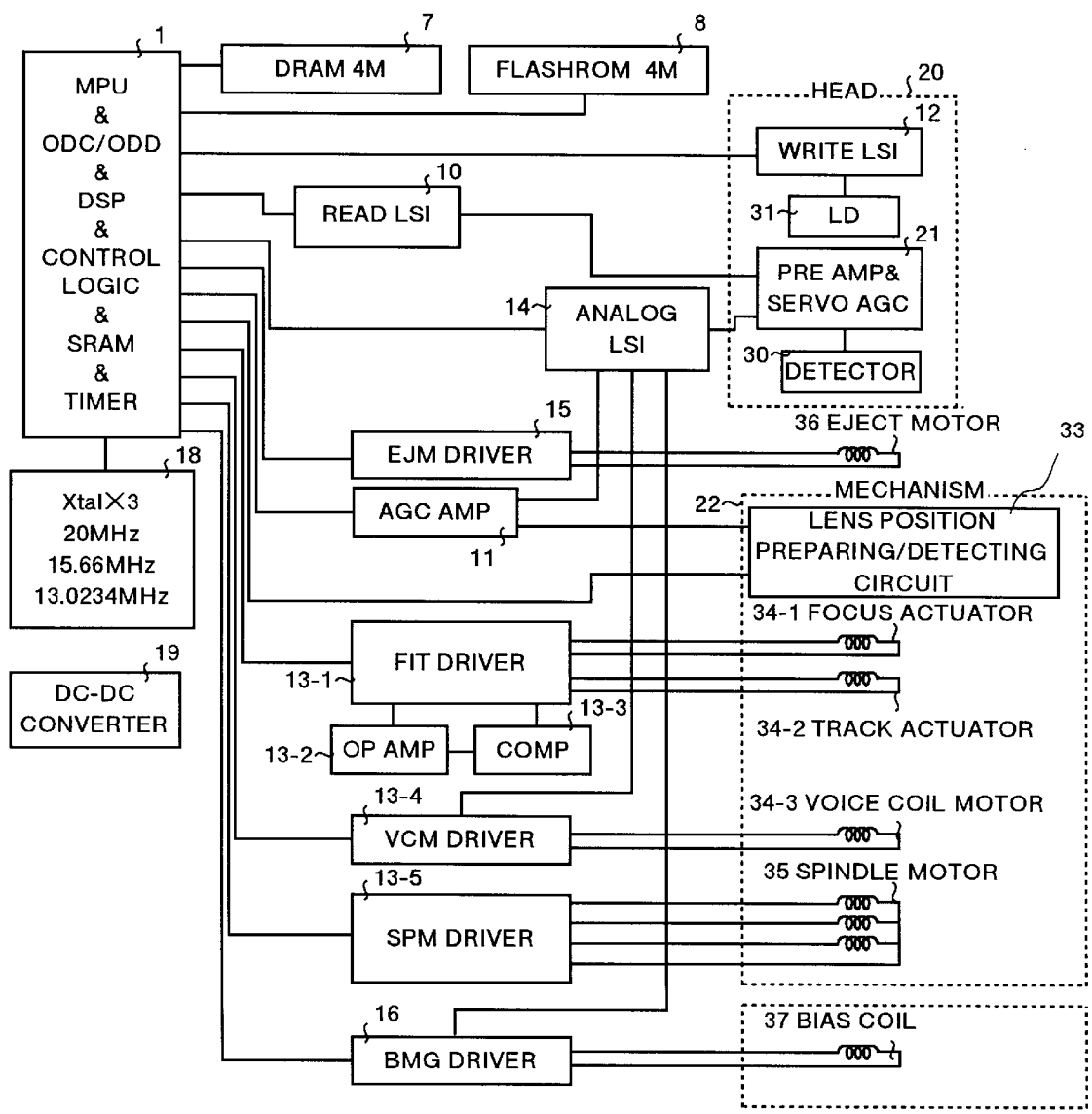
FIG. 2 is a block diagram showing circuits constituting a memory apparatus according to Embodiment 1 of the present invention.

FIG. 1 is a block diagram functionally showing a memory apparatus namely an optical disk unit according to Embodiment 1 of the present invention, and FIG. 2 is a block diagram showing circuits constituting the optical disk unit according to Embodiment 1 of the present invention.

FIG. 1 shows a block diagram of a control circuit for the optical disk unit. A micro-processor (MPU) 2 provides main controls over the unit. A random access memory (RAM) 3 is a memory used for computing by the MPU 2.

An ODC/ODD 4 is firmware comprising an ODC section for encoding/decoding data and an ODD section for providing drive controls, and provides interface controls with an upper host computer. A digital signal processor (DSP) 5 is a unit for providing servo controls over an optical head or the like for an optical disk drive.

A control logic circuit 6 is a logic circuit group for preparing a timing gate for executing data transaction between the MPU 2, ODC/ODD 4 and DSP 5, and the optical head as well as driving mechanism. The MPU 2 obtains time data using a timer 2-1. The timer 2-1 measures time under controls provided by the MPU 2.

The MPU 2, timer 2-1, RAM 3, ODC/ODD 4, DSP 5 and control logic circuit 6 are connected to each other through an internal address/data bus line 9. Then, the MPU 2, RAM 3, ODC/ODD 4, DSP 5, control logic circuit 6 and internal address/data bus line 9 are formed on a single chip, and constitute an LSI 1.

A read-only memory (ROM) 8 is a memory for storing therein a control program executed by the MPU 2. The ROM 8 is connected to the internal bus 9 in the LSI 1. A random access memory (RAM) 7 is a memory used as an operation for writing read data. The RAM 7 is connected to the ODC/ODD 4 through an external address/data bus line 9-1.

In addition to those digital circuits, an analog circuit is provided. The analog circuit comprises a read circuit 10, a write circuit 12, a driving circuit 13, and a servo AGC circuit 21 or the like. The read circuit 10 amplifies output from an optical detector 30 for the optical head and outputs read data to the ODC/ODD 4. The write circuit 12 drives a laser diode 31 for the optical head according to write data from the ODC/ODD 4. With this operation, the data is written in the optical disk.

The driving circuit 13 drives a driving mechanism 32 for the optical head according to a servo signal from the DSP 5. The driving mechanism 32 for the optical head includes a focus actuator for the optical head, a track actuator therefor, and a movable motor therefor or the like. A servo AGC circuit 21 prepares a focus error signal as well as a track error signal from output detected by the optical detector 30 for the optical head. The focus error signal and track error signal are output to the DSP 5.

As described above, the MPU 2, RAM 3, ODC/ODD 4, DSP 5, control logic circuit 6 and internal address/data bus line 9 are accommodated in the LSI 1. For this reason, an area in which each of those circuits is accommodated is reduced, which allows those circuits to be largely minimized. The internal address/data bus line 9 is provided in the LSI 1, a length of an address/data bus line provided in the outside of the LSI 1 can be made shorter. With this feature, an area used only for the address/data bus line on the circuit board can be reduced.

As the digital circuit for inputting or outputting digital signals and the bus line 9 are integrated, radiation of a noise to the external analog circuit can be prevented. For this reason, servo controls can accurately be executed and a reading operation can be stabilized.

Further, the DSP 5 including the A/D converter and D/A converter is a digital/analog hybrid circuit. However, the DSP 5 is also integrated to the internal address/data bus line 9 because of its connection thereto. For this reason, the circuit is more minimized. In addition, radiation of a noise can also be reduced.

Technologically it is possible to accommodate both the ROM 8 and RAM 7 in the LSI 1. However, the RAM 7 has, because it plays a role of a data buffer, the external address/data bus line 9-1 for connection to the ODC/ODD 4 different from the internal address/data bus line 9. It is also necessary to consider a request for change in a buffer size. Resultantly, the RAM 7 is not accommodated in the LSI 1.

The ROM 8 stores therein a control program. Therefore, it is more handy that the control program can be written in the single ROM 8. The control program may be rewritten for version up thereof. In this case, it is also more handy that the control program can be rewritten in the single ROM 8. For this reason, the ROM 8 is not accommodated in the LSI 1. The ROM 8 and/or the RAM 7, however, can also be accommodated in the LSI 1. If one of or both the memories are accommodated therein, further minimization of the circuit can be achieved.

Further detailed description is made with reference to the block diagram of the circuits shown in FIG. 2. As shown in FIG. 2, the LSI 1 has the MPU 2, timer 2-1, ODC/ODD 4, DSP 5, control logic circuit 6, and SRAM 3 formed on a single chip as shown in FIG. 1. Then, three clock sources (crystal oscillators) 18 are connected to this single chip LSI 1.

The clock sources 18 include a clock source for generating a system clock, a clock source for generating a reference clock for a medium type 1 (for a 230 MB/128 MB-medium), and a clock source for generating a reference clock for a medium type 2 (for a 128 MB/540 MB-medium). The RAM 7 comprises a general-purpose 4 MB DRAM. The ROM 8 comprises a general-purpose 4 MB FLASH ROM.

Provided in an optical head 20 are the write LSI 12 and the preamp/servo AGC circuit 21. The write LSI 12 provides light emission controls for reading/writing over the laser diode (light emitting element) 31. Then, the write LSI 12 is connected to the control logic circuit 6 of the LSI 1, and provides light emission controls for reading/writing over the laser diode 31 according to instructions from the MPU 1.

The preamp/servo AGC circuit 21 prepares, after the current detected by the optical detector 30 is transformed to a voltage, a regenerative signal, a focus error signal and a track error signal. The preamp/servo AGC circuit 21 comprises a circuit for preparing a regenerative signal, a circuit for preparing a focus error signal, and a circuit for preparing a track error signal.

The read circuit (LSI) 10 generates a waveform of a regenerative signal (read signal) for the preamp/servo AGC circuit 21, and outputs the pulsed read data to the ODC/ODD 4. The read LSI 10 comprises a waveform generating circuit. The analog LSI 14 is formed by integrating various types of analog circuit used in the unit. The analog LSI 14 executes operations for filtering and amplifying a focus error signal and a track error signal, or the like.

Provided in an optical disk drive mechanism 22 is a lens-position preparing/detecting circuit 33 for detecting a position of a lens for the optical head 20. An AGC amplifier 11 is a circuit for executing a current/voltage conversion for a sensor signal from the detecting circuit 33. A focus actuator 34-1, a track actuator 34-2 and a voice coil motor 34-3 are provided in the optical disk drive mechanism 22 as a driving mechanism for the optical head 20.

The focus actuator 34-1 drives a lens for the optical head 20 in the focus direction and adjusts a focus position of an optical beam. The track actuator 34-2 drives a lens for the optical head 20 in the transverse direction of a track and finely adjusts a track position of an optical beam. The voice coil motor 34-3 moves the optical head 20 in the direction crossing the track on the optical disk.

The DSP 5 executes processing for servo controls in various modes according to a focus error signal and a track error signal each from the analog LSI 14 as well as to a lens-position detection signal from the AGC amplifier 11. Namely, the DSP 5 provides focus servo controls, track servo controls, and seek controls. The DSP 5 has a group comprising A/D converters each for converting from analog to digital a focus error signal, a track error signal, and a lens-position detection signal. Then the DSP 5 computes servo control values (focus servo control value, track servo control value, and seek servo control value) according to those digitally converted signals.

The DSP 5 also has a group comprising D/A converters each for converting each of the servo control values to an analog servo control volume. The DSP 5 outputs the control volume to driving circuits 13-1 and 13-4 for servo controls.

This driving circuit 13-1 is a focus/track driver circuit 13-1 for driving the focus actuator 34-1and track actuator 3-2. The focus/track driver circuit 13-1 comprises known circuits. Namely, the focus/track driver circuit 13-1 comprises an H-type bridge circuits IC having two channels each discretely provided from each other.

Connected to this focus/track driver circuit 13-1 are an operational amplifier 13-2 for detecting a driving current and a comparator 13-3 for setting a driving current. The driving circuit 13-4 is a VCM driver circuit 13-4 for driving the voice coil motor 34-3. The VCM driver circuit 13-4 comprises a general full-bridge circuit. Further, connected to the mechanism 22 are an eject motor 36 for ejecting an optical disk cartridge to the outside and a spindle motor 35 for rotating an optical disk. An eject driver circuit 15 connected to the control logic circuit 6 drives the eject motor 36 according to instructions from the MPU 2.

A spindle driver circuit 13-5 connected to the control logic circuit 6 drives the spindle motor 35 according to instructions from the MPU 2. The spindle driver circuit 13-5 comprises a three-phase sensor-less motor driver. Further, a bias coil 37 for loading a magnetic field to the optical disk is provided therein. A bias driver circuit 16 connected to the control logic circuit 6 drives the bias coil 37 according to instructions from the MPU 2. The bias driver circuit 16 comprises an H-type bridge circuit. A DC-DC converter 19 converts a 5-volt voltage to 3.3 volts to supply power.

As for operations of this control circuit, as known, the DSP 5 provides, after a focus error signal and a track error signal from the analog LSI 14 are converted to digital signals, focus servo controls and track servo controls according to the converted signals. Namely, the DSP 5 outputs a control volume to the focus/track driving circuit 13-1 to drive the focus actuator 34-1 and track actuator 34-2.

Read/write instructions are given to the MPU 2 from an external host computer via the ODC section of the ODC/ODD 4. The MPU 2 instructs a distance for movement to the DSP 5 to position the optical head at a track position on the specified optical disk. The DSP 5 drives the voice coil motor 34-3 via the VCM driver circuit 13-4. The DSP 5 drives the voice coil motor 34-3 while a position of the optical head is detected according to track error signals from the analog LSI 14, and positions the optical head in a specified track.

The write data received by the ODC/ODD 4 is stored in the DRAM 7 from the ODC section, then output to the write LSI 12, and the laser diode 31 is driven. With these operations, the operation for writing is executed in the optical disk. When a read instruction is received, the preamp/servo AGC circuit 21 prepares a regenerative signal from the signal detected by the optical detector 30 for the optical head 20. Regenerative signals are converted to pulses in the read circuit 10 to obtain read data. Read data is output from the read LSI 10 to the ODC section in the ODC/ODD 4, and is stored in the DRAM 7. The read data stored in the DRAM 7 is output from the ODC/ODD 4 to the outside.

Figure 3:
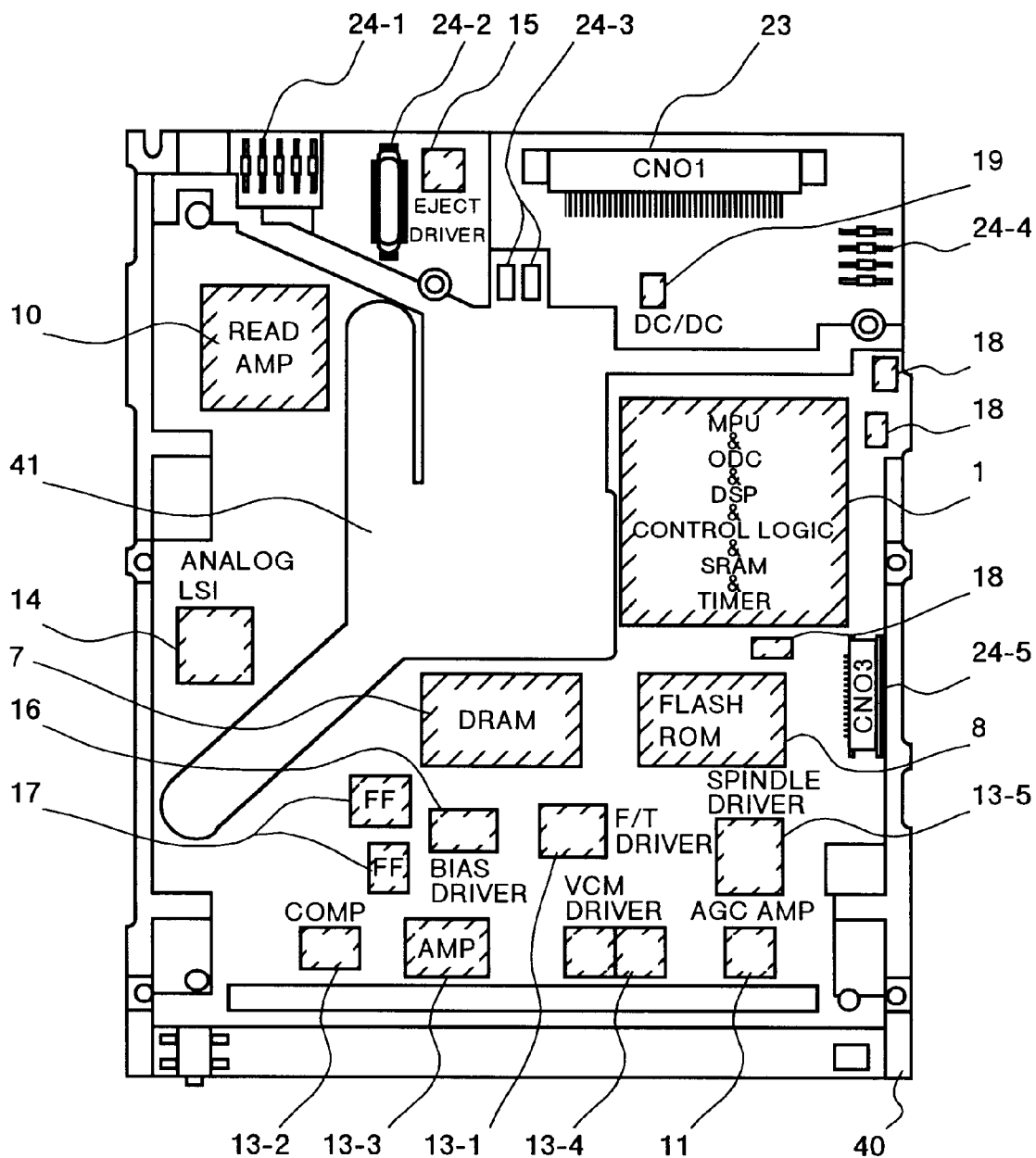
FIG. 3 is a view showing a circuit packaged on the memory apparatus shown in FIG. 2
Figure 4:
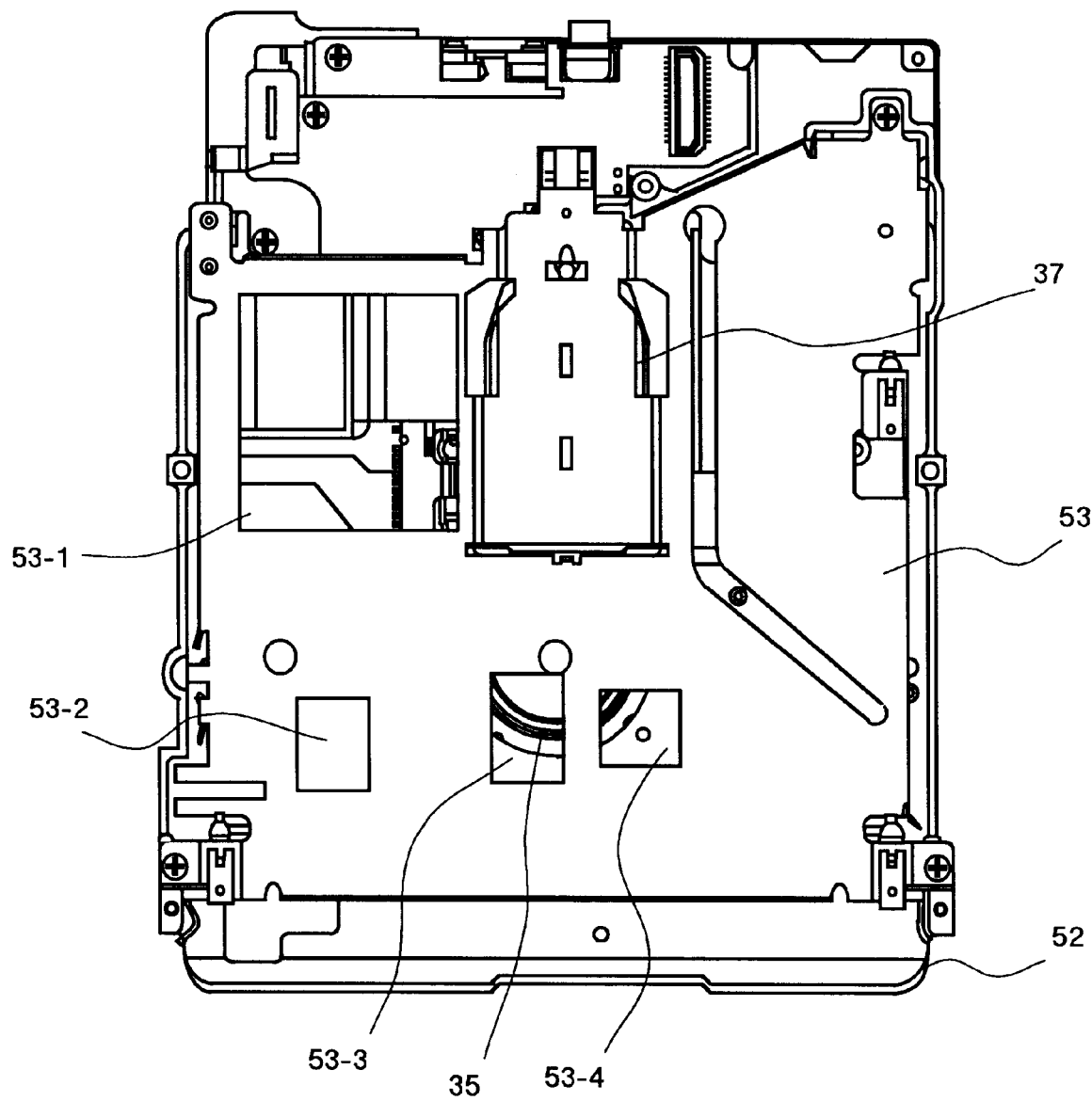
FIG. 4 is a top plan view showing a drive mechanism according to Embodiment 1 of the present invention.
Figure 5:
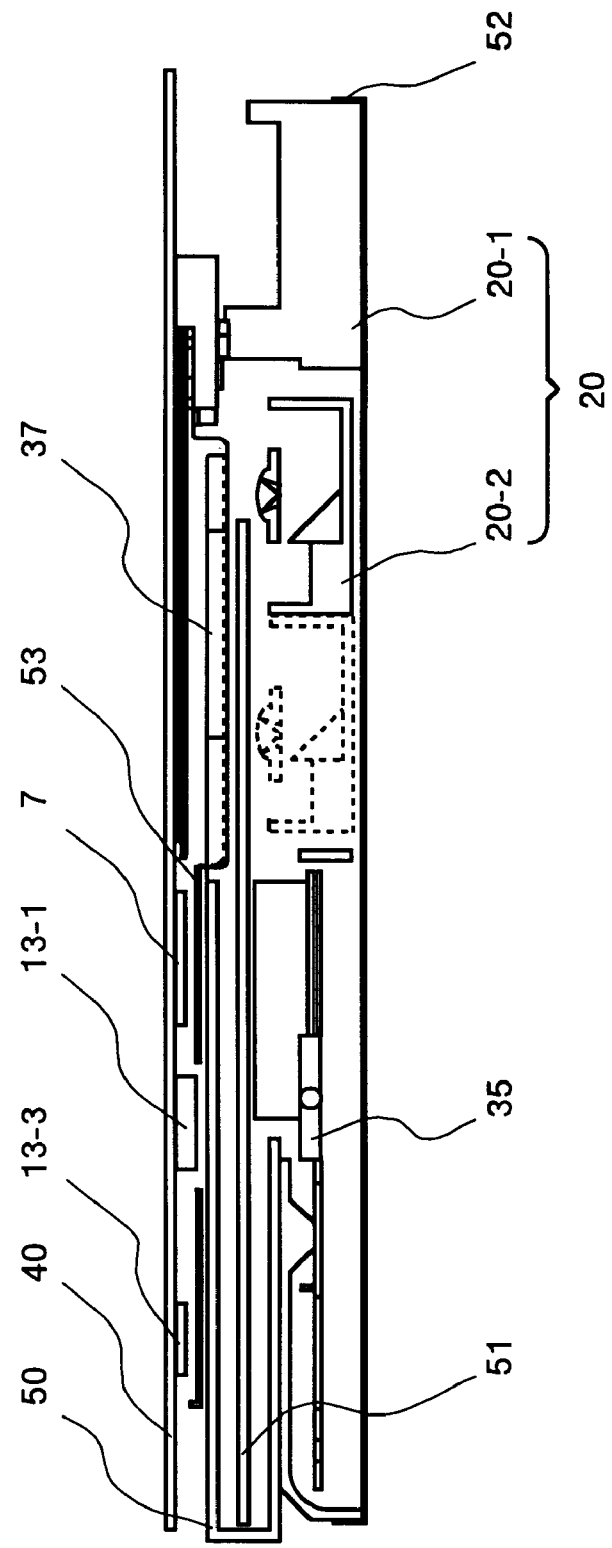
FIG. 5 is a cross-sectional view showing the memory apparatus according to Embodiment 1 of the present invention.

FIG. 3 is a circuit package view showing the optical disk unit according to Embodiment 1 of the present invention, FIG. 4 is a top plan view of the optical disk unit, and FIG. 5 is a cross-sectional view thereof.

FIG. 3 shows a package surface of a circuit board 40 in the side of optical disk drive. As shown in FIG. 3, an area 41 where any components can not be packaged is provided in the center of the circuit board 40. As shown in FIG. 4, the bias coil 37 is provided at the position corresponding to the optical disk drive mechanism. Therefore, no components can be mounted at the center on the circuit board 40.

An address/data bus line or the like is wired on the area 41 of this circuit board 40. The LSI 1, ROM 8, RAM 7, analog LSI 14, and read LSI 10 are provided around the area 41. The driver circuits 13-1, 13-4, 13-5, and 16 are provided in the lower part of the above components. No component is mounted on the opposite surface of the circuit board 40.

It should be noted that the reference numeral 23 indicates an IDE (Integrated Device Electronic) interface connector, and the reference numerals 24-1 to 24-5 indicate connectors each for connection to the optical disk drive respectively. A flip-flop circuit 17 is used for driving an external address.

As shown in FIG. 5, an optical disk drive mechanism 52 has the spindle motor 35 and optical head 20. The spindle motor 35 rotates an optical disk 51 in a cartridge case 50.

The optical head 20 has a fixed section 20-1 and a movable section 20-2. The laser diode 31 and optical detector 30 are provided in the fixed section 20-1 which is fixed to the base of the unit. The movable section 20-2 is moved by the voice coil motor 34-3 in the direction crossing the track on the optical disk 51. The lens, focus actuator 34-1, track actuator 34-2, and lens-position detector 33 are provided in the movable section 20-2.

A cartridge holder 53 is mounted on the fixed section 20-1. The cartridge holder 53 holds an inserted cartridge case 50. The cartridge holder 53 has a top surface and two side faces. The bias coil 37 for loading a magnetic field to the disk is provided at the center of the top surface of the cartridge holder 53.

As shown in FIG. 5, no component is mounted on the top surface of the circuit board 40. All components are mounted on the bottom surface of the circuit board 40. Then the circuit board 40 is fixed to the optical disk drive 52 with the bottom surface of the board opposite thereto. The LSI 1 and driver circuits 13-5, 13-1 and 16 each provided on the circuit board 40 are comparatively high in height. For this reason, when the circuit board 40 is attached closely to the cartridge holder 53 of the optical disk drive 52, there is no room between the LSI 1, driver circuits 13-5, 13-1and 16 and the cartridge holder 53. Then, those components high in height such as the LST 1 and driver circuits 13-5, 13-1 and 16 may possibly contact the top surface of the cartridge holder 53.

In order to prevent the contact, as shown in FIG. 4, holes 53-1 to 53-4 each for inserting therein a component are provided on the top surface of the cartridge holder 53. When the circuit board 40 is attached to the optical disk drive 52, the comparatively high LSI 1 and driver circuits 13-5, 13-1 and 16 are opposed to the holes 53-1 to 53-4 respectively. Namely, a section equivalent to a board thickness of the top surface of the cartridge holder 53 in the optical disk drive 52 is used as a room for accommodating comparatively high components therein.

As described above, there is no component mounted on the top surface of the circuit board 40 and the circuit board 40 with the components mounted thereon is provided closely to the optical disk drive mechanism 52, so that the thickness of the optical disk unit including the circuit board 40 can be made thinner. Accordingly, an optical disk unit having a thickness of 17 mm can be realized. As described above, components are packaged only on one side of the circuit board 40 attached to the optical disk drive mechanism 52, which allows the thickness of the optical disk unit to be made thinner.

The address/data bus line and the MPU 2, RAM 3, ODC/ODD 4, DSP 5 and control logic circuit 6 each connected to the line are accommodated in one unit of LSI 1 by being integrated in a single chip, which allows those circuits to be made smaller and the address/data bus line on the circuit board 40 to have a minimum length. For this reason, it is possible to minimize the circuit board 40 and to package components only on one side of the circuit board 40.

Figure 6:
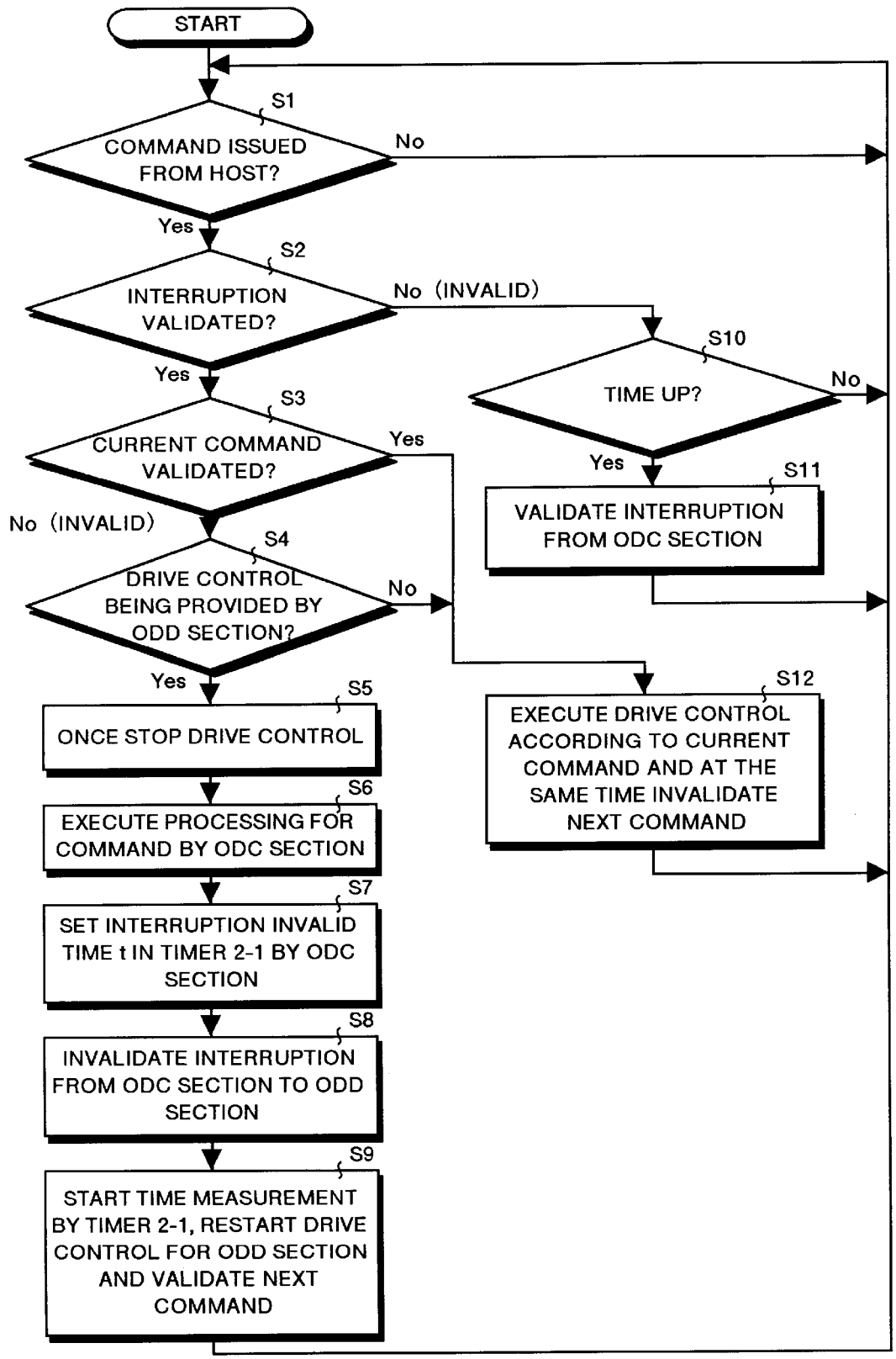
FIG. 6 is a flowchart for explaining operations according to Embodiment 1 of the present invention.

Next description is made for operations. FIG. 6 is a flowchart for explaining operations according to Embodiment 1 of the present invention. It is assumed herein that drive control in the ODD section (ODC/ODD 4) is executed by controlling interruption. In the control circuit shown in FIG. 1, when a command is issued from a host computer not shown in the figure (step S1), determination is made as to whether an interruption from the ODC section is validated to the control currently provided by the MPU 2 or not (step S2). The validation of an interruption indicates herein that a current risk operation is not insured, and also invalidation of an interruption indicates that the disk operation is insured. These validation and invalidation are described in detail later in the same flow.

When it is determined in step S2 that the interruption is validated, determination is further made as to whether the current command is validated or not (step S3). The validation of the current command indicates herein that the operation for disk control is executed according to the command currently being issued from the host computer, and also invalidation of the current command indicates that the operation for disk control is not executed. These validation and invalidation are described in detail later in the same flow. It should be noted that, when the interruption is invalidated (step S2), the processing returns to step S1.

When it is determined in step S3 that the current command is invalidated, determination is made as to whether the drive control is being provided by the ODD section or not (step S4), and if it is determined that the operation is being executed, the operation for drive control is once stopped and processing for shifting the operation for control by the MPU 2 to the ODC section is executed (step S5).

When it is determined in step S3 that the current command is validated or when it is determined in step S4 that the drive control is not being provided, the processing shifts to step S12. In step S12, the drive control is provided according to the current command, and the processing for invalidating the next command is executed. As for invalidation or validation of the next command, there are some methods of storing the matter as flag data or managing it as data by providing a register or the like. After the step S12, the processing returns to step S1.

When the operation for drive control is once stopped in step S5, then the processing for the command is executed in step S6 by the ODC section to which the operation for control has been shifted. Then, an interruption invalid time t is set in the timer 2-1 by the ODC section (step S7). This interruption invalid time t is a time for insuring, during the period of time, the operation for drive control by the ODD section and disabling an interruption from the ODC section thereto. A time measured by the timer 2-1 is practically obtained by converting n-steps in the ODD section to the time.

This interruption invalid time t can be obtained from the processing time per each sector in an inner sector as well as an outer sector on each medium (128 MB, 230 MB, 540 MB, 640 MB) having a different recording density.

| (Medium) | (Inner) | (Outer) |
| --- | --- | --- |
| 128 MB | 666.667 μS | 666.667 μS |
| 230 MB | 555.556 μs | 347.222 μs |
| 540 MB | 333.333 μs | 198.412 μs |
| 640 MB | 1111.111 μs | 666.667 μs |

Namely, the time shown in the above table may be used as time t as it is. It should be noted that the interruption invalid time t may dynamically be specified by an upper host computer by using a device driver or the like.

Then, an interruption from the ODC section to the ODD section is invalidated (step S8), time measurement is started by the timer 2-1, drive control for the ODD section is restarted, and further the next command is validated (step S9). Then the processing returns to step S1. In order to validate or invalidate an interruption from the ODC section, such a method as storing the matter as flag data or managing it as data by providing a register or the like may be employed.

In the processing flow above, even if a command is issued from the host computer during execution of the operation for drive controls by the ODD section, it does not mean that the operation is instantly shifted, by determining the command as an interruption, to a new operation for drive control, but indicates that the current operation for drive control is insured during an arbitrary period of time from generation of the interruption.

As described above, after an interruption from the ODC section is invalidated (step S7) and the next command is validated (step S9), even if commands are successively issued from the host computer (step S1), during the period when an interruption by issuing the command is invalidated (step 2), any interruption is invalidated until the interruption invalid time t is over, namely until the specified period of time is over (step S10).

Then, when the MPU 2 checks that the time has been out according to the time measured by the timer 2-1 (step S10) at first the interruption from the ODC section is validated (step S11). Check of this time-out is carried out as an interruption to a timer even if a command for that is not issued from the host computer.

Accordingly, when the next command is issued (step S1), the interruption according to the issued command is validated (step S2), and further the next command is validated as the current command (step S3), so that the drive processing is executed according to the current command and at the same time the next command is set to be invalidated (step S12).

For this reason, even if the next command issued from the host computer is validated, the current command is subjected to invalidation in step S3. Namely, when it is determined in step S4 that drive control is being provided, as described above, the processing for drive control is not executed according to the current command but is executed according to the command issued after the interruption invalid time t is over.

As described above, with Embodiment 1, time from generation of a previous interruption by the host computer is measured, and the next interruption is invalidated by the processor until the measured time is over a prespecified time. For this reason, the driving operation can further be continued until the next interruption is validated, which makes it possible to present generation of abnormal termination of a driving operation or the like.

A prespecified period of time may arbitrarily be specified from the host computer, and in this case, it is possible to insure a minimum period of time required for realizing a smooth driving operation. Also, the prespecified period of time may variably be specified according to any one of a recording density in a medium, a head position, and contents of an instruction from the host computer, or to combination of two or more thereof, and in this case it is possible to more dynamically insure a driving operation.

In Embodiment 1, an operation for drive controls is prevented from being abnormally terminated by invalidating an interruption by providing controls by the MPU 2 for an arbitrary period of time when a command is issued from the host computer, but, like in Embodiment 2 described hereinafter, the operation for drive control may be prevented from being abnormally terminated by invalidating an interruption by providing controls by any unit other than the MPU 2 for an arbitrary period of time when a command is issued from the host computer.

Figure 7:
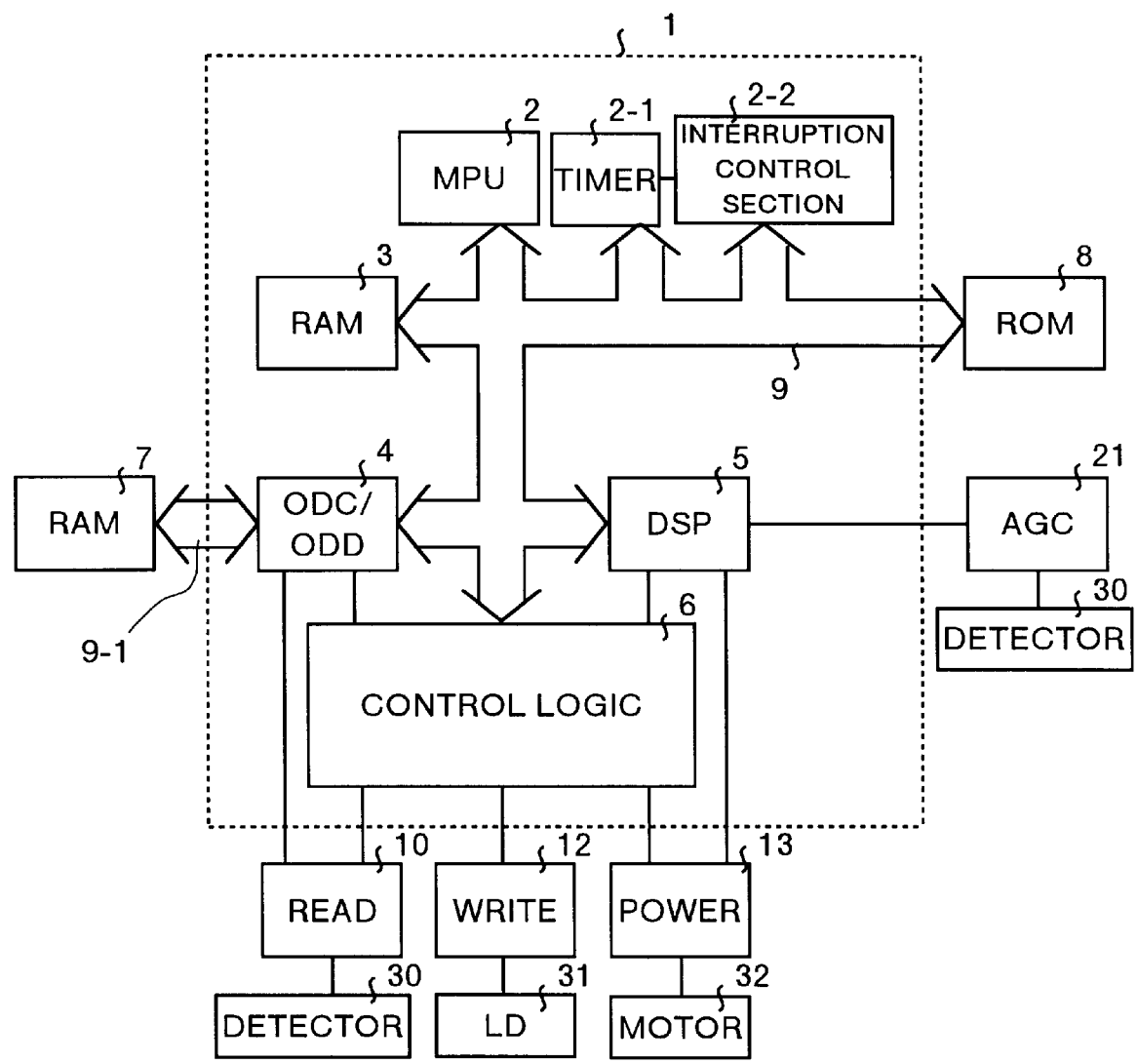
FIG. 7 is a block diagram functionally showing a memory apparatus according to Embodiment 2 of the present invention.

At first description is made for some points of configuration which are different from those in the configuration according to Embodiment 1. FIG. 7 is a block diagram functionally showing a memory apparatus according to Embodiment 2 of the present invention. In the configuration shown in FIG. 7, the same reference numerals are assigned to the sections corresponding to those in Embodiment 1. The section found different from the configuration shown in FIG. 1 is a section added thereto, which is an interruption control section 2-2 connected to the internal address/data bus line 9 in the LSI 1.

The interruption control section 2-2 is connected also to the timer 2-1, monitors a time measured by the timer 2-1, and sets invalidation or validation of an interruption by the ODC section according to starting of time measurement (a set state of an interruption invalid time t) as well as to ending of the measurement. Namely, in Embodiment 2, the section where the MPU 2 monitors time measurement by the timer 2-1 and provides interruption controls over the ODC section in Embodiment 1 is replaced with the external interruption control section 2-2 provided outside of the MPU 2.

Figure 8:
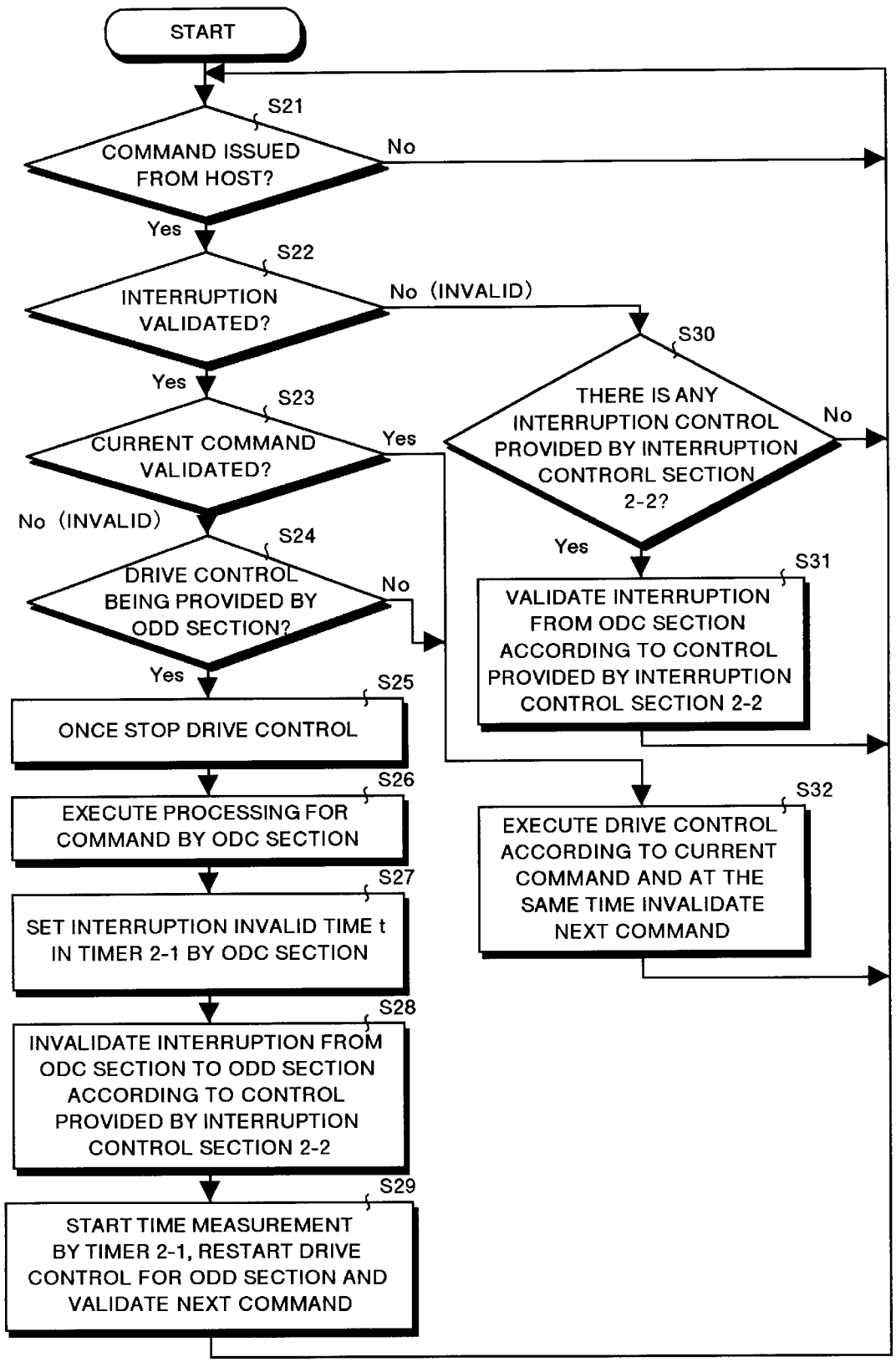
FIG. 8 is a flowchart for explaining operations according to Embodiment 2 of the present invention.
Figure 9:
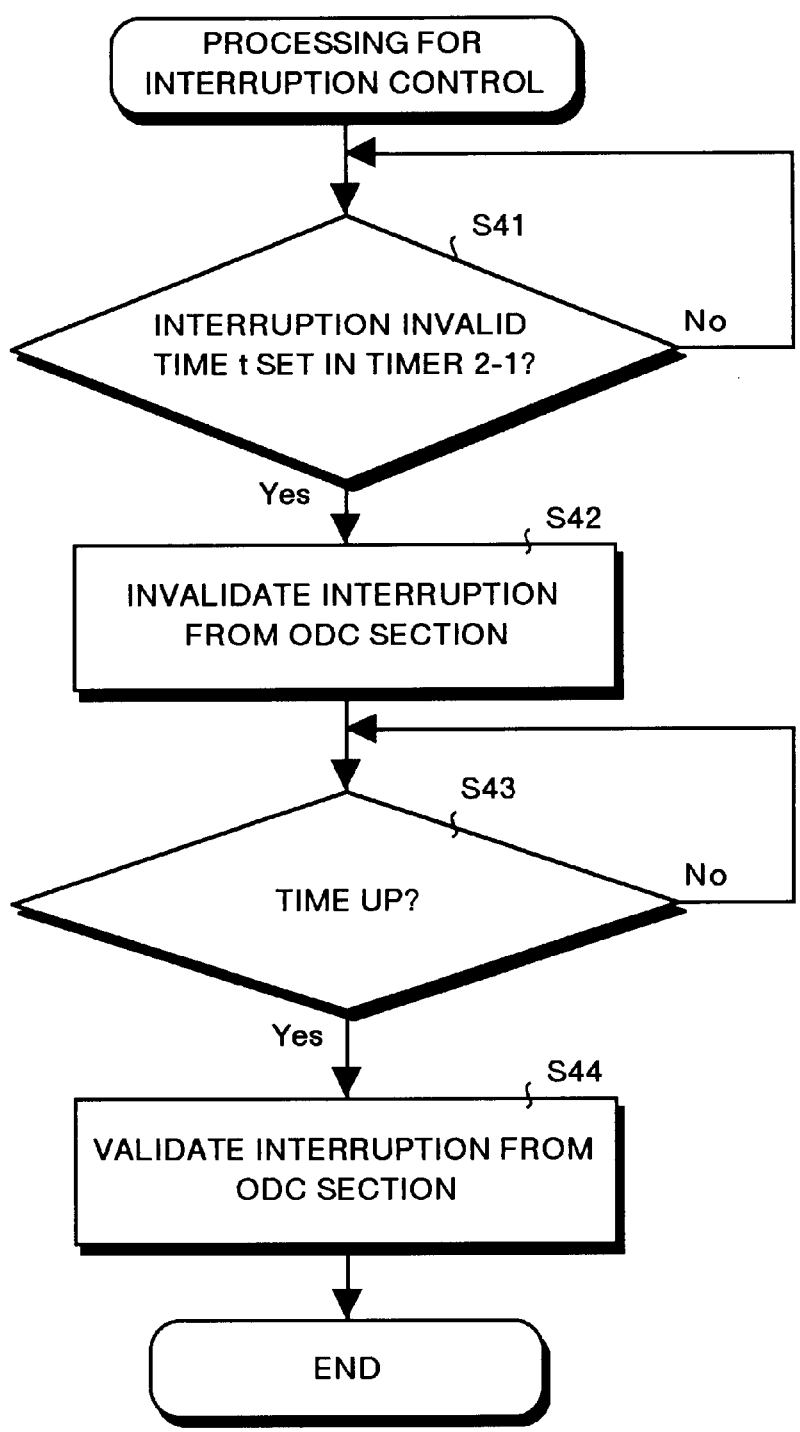
FIG. 9 is a flowchart for explaining interruption controls according to Embodiment 2 of the present invention.

Next description is made for operations. FIG. 8 is a flowchart for explaining operations in Embodiment 2 of the present invention, and FIG. 9 is a flowchart for explaining interruption controls according to Embodiment 2 of the present invention. The drive controls by the ODD section herein is executed under interrupt controls by the ODC section.

In the control circuit shown in FIG. 7, when a command is issued from a host computer not shown in the figure (step S21), determination is made as to whether an interruption from the ODC section is validated for the control currently provided by the MPU 2 or not (step S22). When it is determined in step S22 that the interruption is validated, determination is further made as to whether the current command is valid or not (step S23).

When it is determined in step S23 that the current command is invalid, determination is made as to whether the drive control is being provided by the ODD section or not (step S24), and if it is determined that the operation is being provided, the operation for drive control is once stopped and processing for shifting the operation for control by the MPU 2 to the ODC section is executed (step S25).

When it is determined in step S23 that the current command is valid or when it is determined in step S24 that the drive control is not being provided, the processing shifts to step S32. In step S32, the drive control is provided according to the current command and at the same time the processing for invalidatingthe next command is executed. After the step S32, the processing returns to step S21.

When the operation for drive control is once stopped in step S25, the processing for the command is executed in step S26 by the ODC section to which the operation for control has been shifted. Then, an interruption invalid time t is set in the timer 2-1 by the ODC section (step S27). This interruption invalid time t can be obtained, like in Embodiment 1, from the processing time per each sector in an inner sector as well as an outer sector on each medium (128 MB, 230 MB, 540 MB, 128 MB) having a different recording density.

Whether the interruption invalid time t has been set in the timer 2-1 or not is monitored by the interruption control section 2-2. For this reason, when the interruption control section 2-2 detects that the interruption invalid time t has been set, an interruption from the ODC section to the ODD section is invalidated according to the control provided by the interruption control section 2-2 (step S28). Then time measurement is started by the timer 2-1, the provision of drive control over the ODD section is restarted, and further the next command is validated (step S29). Then the processing returns to step S21.

In the flow of the above processing, a command is issued from the host computer during execution of the operation for drive controls by the ODD section, which does not indicate that the operation is instantly shifted, by means of determining the command as an interruption, to a new operation for drive control, but indicates that the current operation for drive control is insured during an arbitrary period of time from generation of the interruption.

As described above, after an interruption from the ODC section is invalidated (step S27) and the next command is validated (step S29), and then even if commands are successively issued from the host computer (step S21), during the period of time for invalidating an interruption according to issuing of the command (step S22), any interruption is invalidated until the interruption invalid time t is over namely until the time-out occurs (step S30).

As check of time-out is carried out by the interruption control section 2-2, the detail thereof is described with reference to FIG. 9. The interruption control section 2-2 invalidates, when detecting that the interruption invalid time t has been set in the timer 2-1 (step S41), an interruption from the ODC section (step S42). Namely, an instruction that the ODC section is prohibited to interrupt the operation for drive controls by the ODD section is given to the ODC section. With this instruction, the MPU 2 invalidates all interruptions by the ODC section.

Then, the interruption control section 2-2 maintains the state where any interruption is invalidated until the interruption invalid time t is out by monitoring time measured by the timer 2-1 (step S43). Then, the interruption control section 2-2 validates, when the time-out is checked by measuring time by the timer 2-1 (step S43), an interruption from the ODC section (step S44).

At this point of time, interruption control is input from the interruption control section 2-2 into the MPU 2 in step S30, and the interruption from the ODC section is validated according to the interruption control in step S31. Then, the processing returns to step S21. It is assumed that checking of this interruption control is executed by the interruption without issuing of the command for it from the host computer.

When the next command is issued from the host computer (step S21), the interruption according to the issued command is validated (step S22), and further the next command is validated, namely the current command is validated (step S23), SO that the drive processing is executed according to the current command and at the same time the next command is invalidated (step S32).

For this reason, even if the next command issued from the host computer is validated, the current command is invalidated in step S23. Namely, when it is determined in step S24 that drive control is being provided, as described above, the processing for drive control is not executed according to the current command but is executed according to the command issued after the interruption invalid time t is over.

As described above, with Embodiment 2, time measurement from generation of a previous interruption by the host computer is measured, and the next interruption is invalidated by hardware until the measured time is over a pre-specified time. For this reason, the driving operation can further be continued until the next interruption is validated, which allows the driving operation to be prevented from being abnormally terminated.

Also a prespecified period of time may arbitrarily be specified from the host computer, and in this case it is possible to insure a minimum period of time required for realizing a smooth driving operation. Also, the prespecified period of time may variably be specified according to any one of a recording density in a medium, a head position, and contents of an instruction from the host computer, or to combination of two or more thereof, and in this case it is possible to more dynamically insure a driving operation.

In Embodiment 2, the operation for drive controls is prevented from being abnormally terminated by invalidating an interruption for an arbitrary period of time by measuring time by the timer 2-1 when a command is issued from the host computer, but, like in Embodiment 3 described hereinafter, the operation for drive control may be prevented from being abnormally terminated by invalidating an interruption only for an arbitrary period of time by the method other than the timer interrupt namely by counting the number of steps executed in the ODD section when a command is issued from the host computer.

Figure 10:
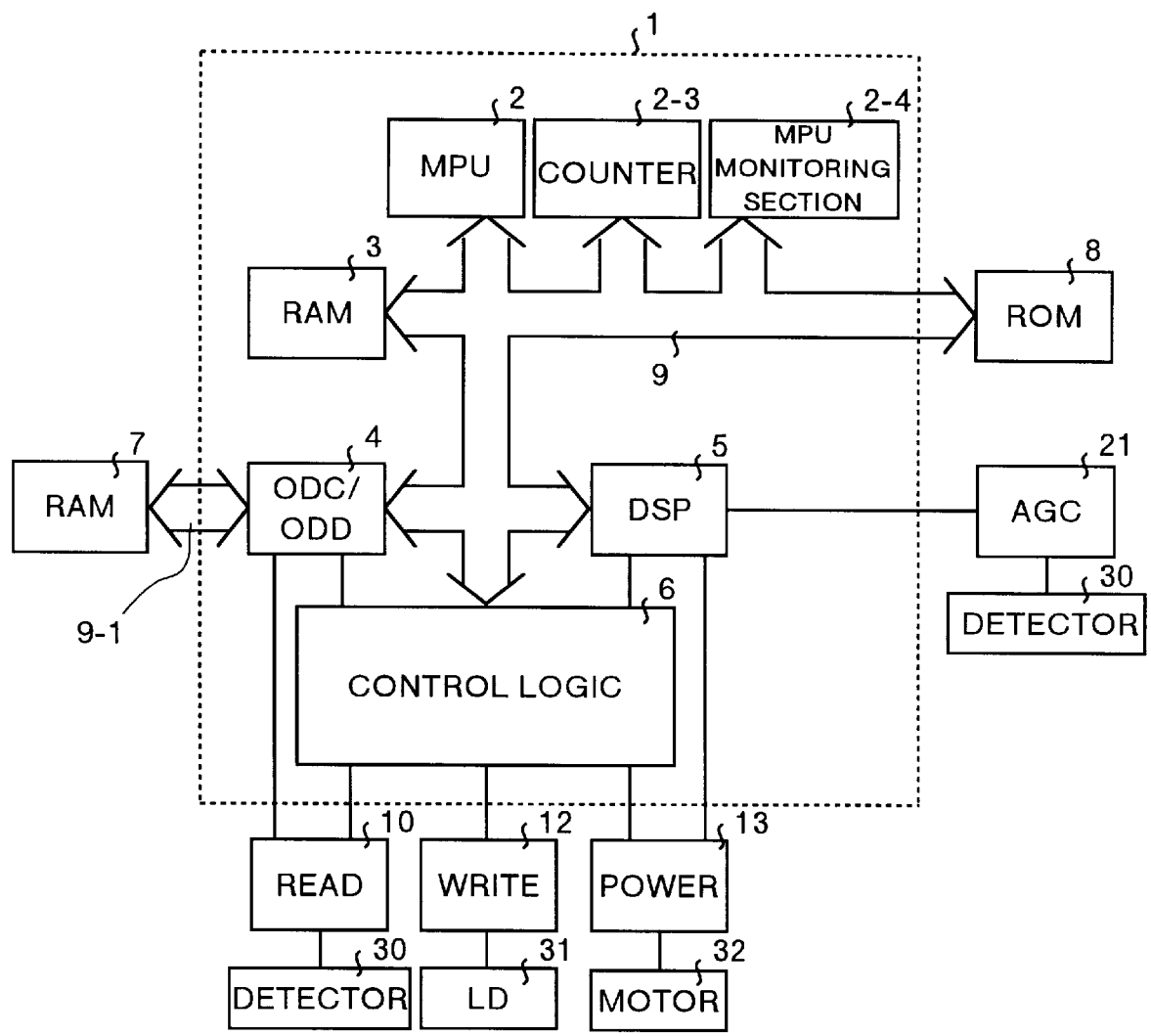
FIG. 10 is a block diagram functionally showing a memory apparatus according to Embodiment 3 of the present invention.

At first description is made for some points of the configuration which are different from those in the configuration according to Embodiments 1 and 2. FIG. 10 is a block diagram functionally showing a memory apparatus according to Embodiment 3 of the present invention. In the configuration shown in FIG. 10, the same reference numerals are assigned to the sections corresponding to those in Embodiments 1 and 2. The different points from those in the configuration shown in FIG. 1 and FIG. 7 are those where, in place of the timer 2-1 and interruption control section 2-2, a counter 2-3 and a MPU monitoring section 2-4 are connected to the internal address/data bus line 9 in the LSI 1 respectively.

The counter 2-3 is a step counter for counting the number of processing steps in the ODD section. A count-down system is employed herein for counting. Namely, when n is set as the number of steps, the number of steps n is counted down step by step for each step processed by the ODD section. The MPU monitoring section 2-4 is connected also to the counter 2-3, monitors a count by the counter 2-3 namely a program counter by the MPU 2, and invalidates or validates an interruption by the ODC according to the number of steps processed in the ODD section.

Namely, in Embodiment 3, a function of the section for monitoring time measurement by the timer 2-1 and providing interruption controls over the ODC section in Embodiment 2 is played by an external MPU monitoring section 2-4 provided outside of the MPU 2.

Figure 11:
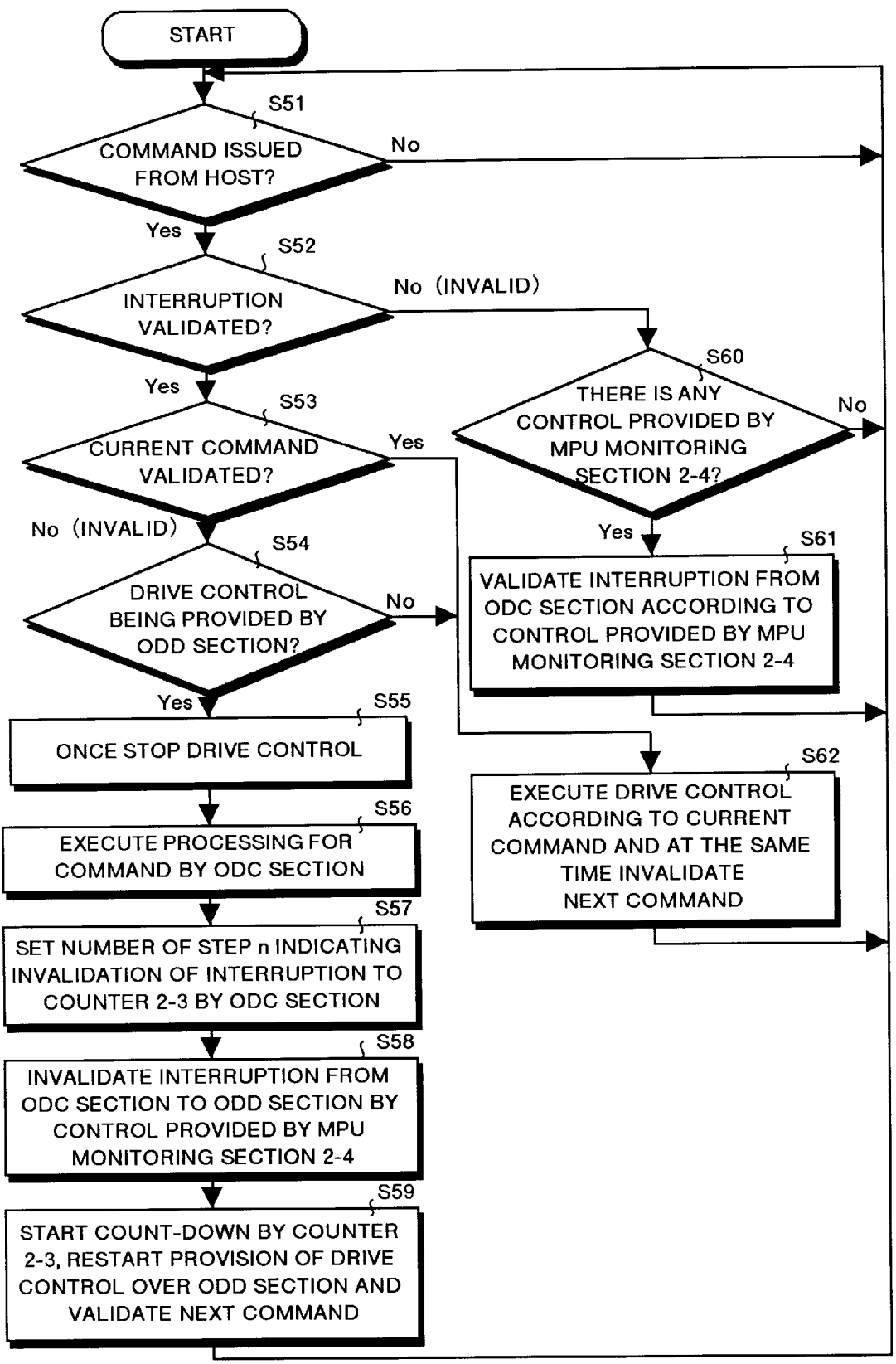
FIG. 11 is a flowchart for explaining operations according to Embodiment 3 of the present invention.
Figure 12:
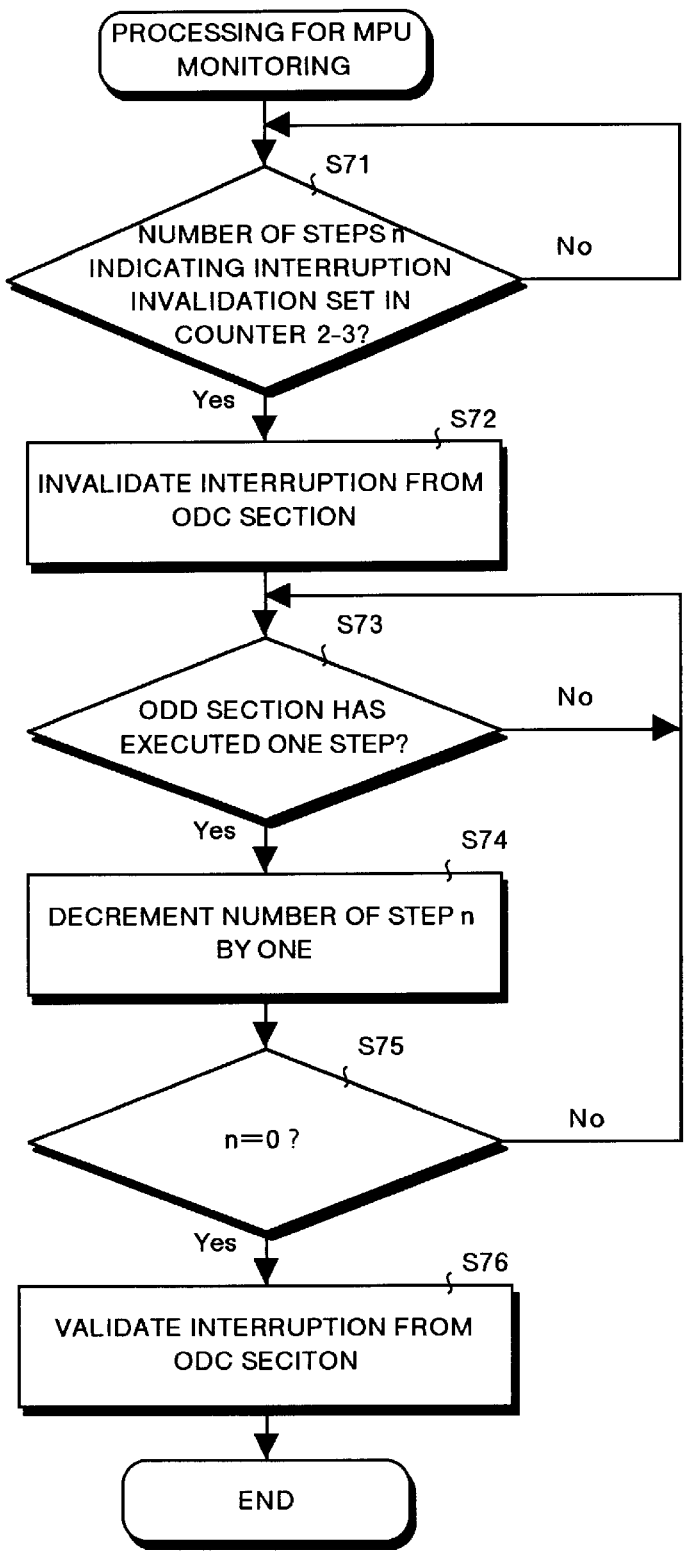
FIG. 12 is a flowchart for explaining interruption controls according to Embodiment 3 of the present invention.
Figure 13:
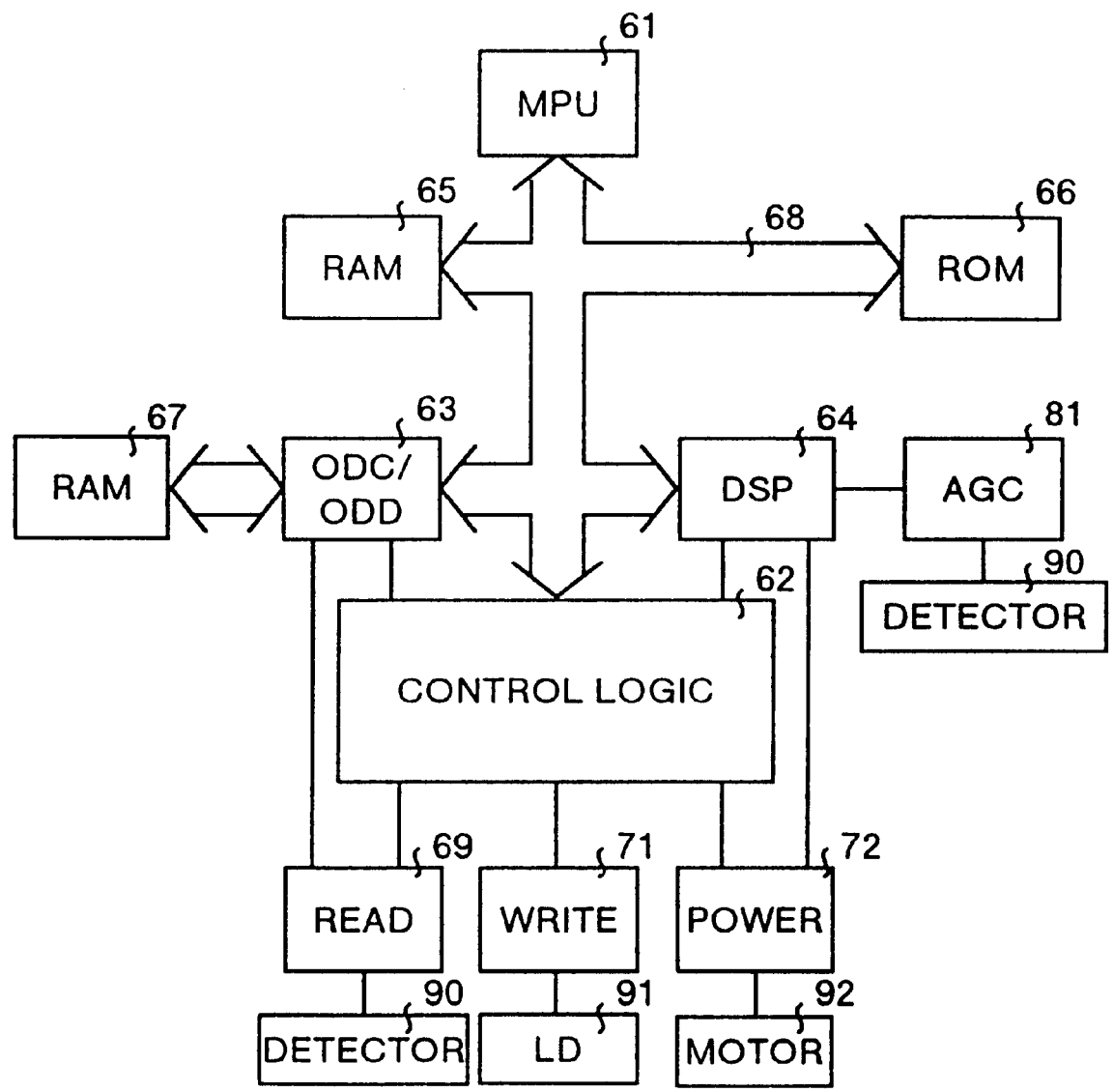
FIG. 13 is a block diagram functionally showing a memory apparatus based on the conventional technology.
Figure 14:
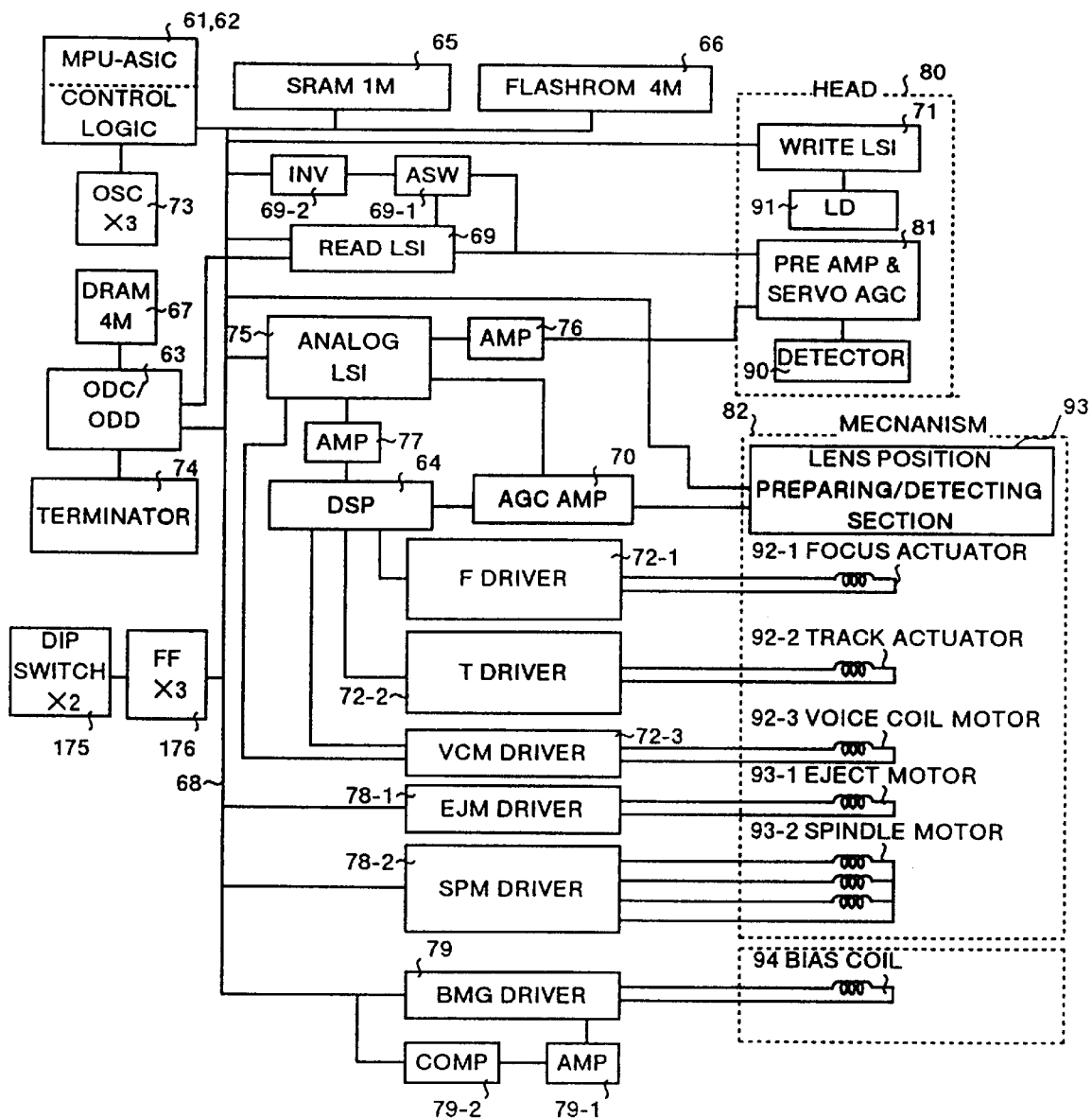
FIG. 14 is a block diagram showing circuits constituting the memory apparatus based on the conventional technology.
Figure 15:
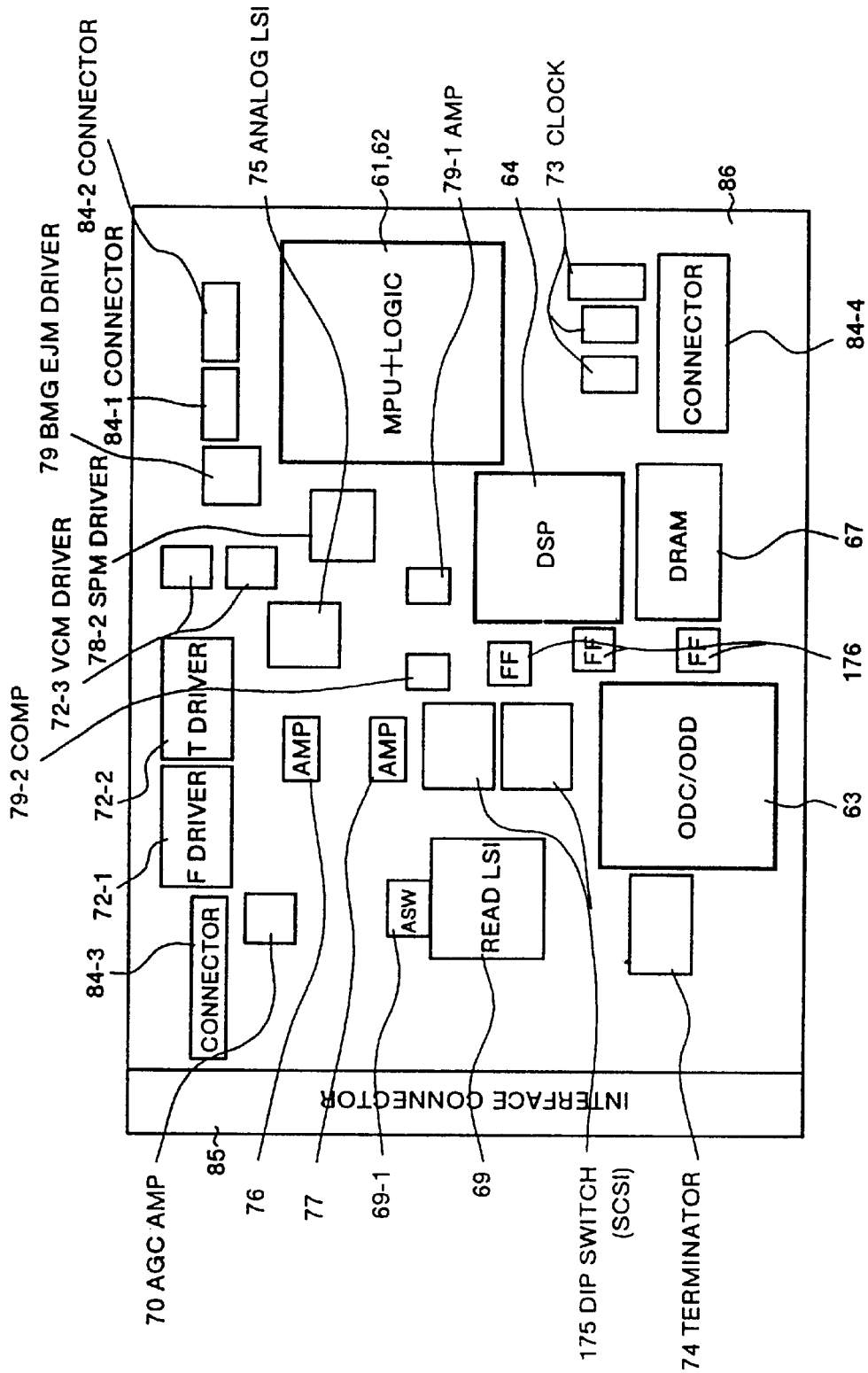
FIG. 15 is a circuit package diagram showing one example of the memory apparatus based on the conventional technology.
Figure 16:
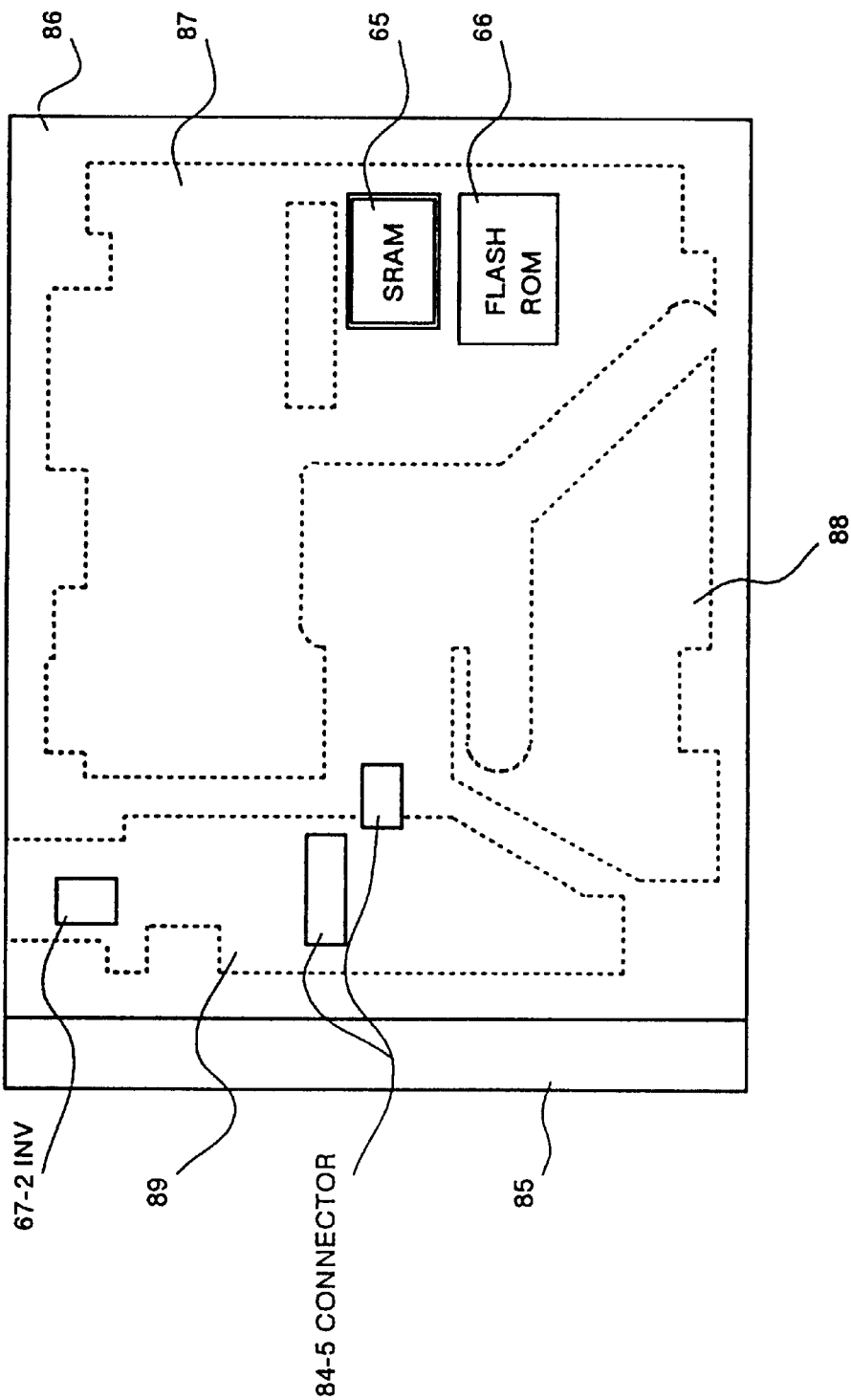
FIG. 16 is a circuit package diagram showing another example of the memory apparatus based on the conventional technology.
Figure 17:
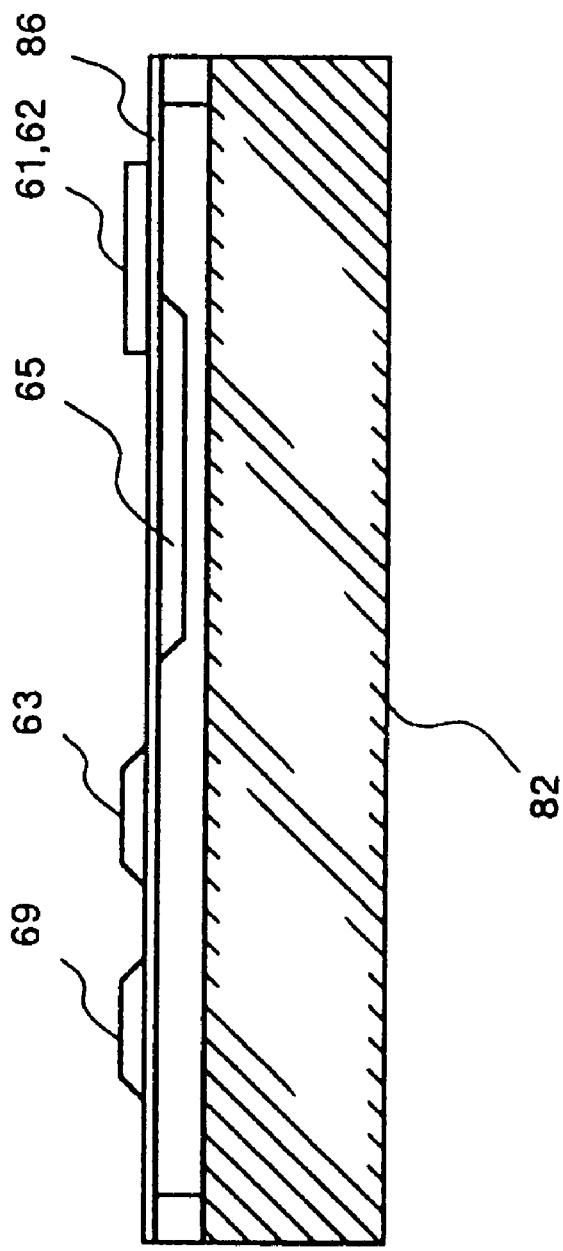
FIG. 17 is an explanatory view showing configuration of the memory apparatus based on the conventional technology.

Next description is made for operations in this embodiment. FIG. 11 is a flowchart for explaining operations according to Embodiment 3 of the present invention, and FIG. 12 is a flowchart for explaining interruption controls according to Embodiment 3 of the present invention. It is assumed herein that the operation for drive controls over the ODD section herein is executed by providing interruption controls over the ODC section.

In the control circuit shown in FIG. 10, when a command is issued from a host computer not shown in the figure (step S51), determination is made as to whether an interruption from the ODC section is valid for the control currently provided by the MPU 2 or not (step S52). When it is determined in step S52 that the interruption is valid, determination is further made as to whether the current command is valid or not (step S53).

When it is determined in step S53 that the current command is invalid, determination is made as to whether the drive control is being provided by the ODD section or not (step S54), and if it is determined that the operation is being provided, the operation for drive control is once stopped and processing for shifting the operation for control by the MPU 2 to the ODC section is executed (step S55).

When it is determined in step S53 that the current command is valid, or when it is determined in step S54 that the drive control is not being provided, the processing shifts to step S62. In step S62, the drive control is provided according to the current command and at the same time the processing for invalidating the next command is executed. After the step S62, the processing returns to step S51.

When the operation for drive control is once stopped in step S55, the processing for the command is executed in step S56 by the ODC section to which the operation for control has been shifted. Then, the number of steps n for giving an interruption invalid time to the counter 2-3 is set therein by the ODC section (step S57). This number of steps n indicating invalidation of an interruption can be obtained, like in Embodiment 1, from the processing time per each sector in an inner sector as well as an outer sector on each medium (128 MB, 230 MB, 540 MB, 128 MB) having a different recording density.

Namely, when the MPU 2 operates at 25 MHz, for instance, a time required for executing a single step (clock) is 0.04 $\mu$s, so that the number of steps n can be obtained from the following expression (1).

$$n = \text{Processing time per one sector } (\mu s)/0.04(\mu s) \quad (1)$$

An appropriate number of steps n can be obtained by substituting a processing time per each sector in an inner sector as well as in an outer sector in the above expression (1) according to the each medium. For example, in the medium having 128 MB, the inner sector is 666.667 $\mu$s, and when this value is substituted in the expression (1), the following value is obtained:

$$n = 666.667/0.04$$

$$\approx 1666$$

Accordingly, the number of steps n set for invalidating an interruption in the inner sector is 1666 times.

Whether the number of steps n has been set in the counter 2-3 or not is monitored by the MPU monitoring section 2-4. For this reason, when the MPU monitoring section 2-4 detects that the number of steps n has been set, an interruption from the ODC section to the ODD section is invalidated by the control provided by the MPU monitoring section 2-4 (step S58). Then count-down is started by the counter 2-3, the provision of drive control over the ODD section is restarted, and further the next command is validated (step S59). Then the processing returns to step S51.

In the processing flow above, even if a command is issued from the host computer during execution of the operation for drive controls by the ODD section, it does not indicate that the operation is instantly shifted, by determining the command as an interruption, to a new operation for drive control, but indicates that the current operation for drive control is insured during an arbitrary period of time from generation of the interruption.

As described above, after an interruption from the ODC section is invalidated (step S57) and the next command is validated (step S59), and then even if commands are successively issued from the host computer (step S51), during the period of time for invalidating an interruption according to issuing of the command (step S52), any interruption is invalidated until the number of steps n becomes "0" (step S60).

As check of the number of steps "0" is carried out by the MPU monitoring section 2-4, the detail thereof is described with reference to FIG. 12. The MPU monitoring section 2-4 invalidates, when detecting that the number of steps n has been set in the counter 2-3 (step S71), an interruption from the ODC section (step S72). Namely, an instruction that the ODC section is prohibited to interrupt the operation for drive controls by the ODD section is given to the ODC section. With this instruction, the MPU 2 invalidates all interruptions by the ODC section.

Then, the MPU monitoring section 2-4 maintains the state where any interruption is invalidated until the number of steps n becomes zero "0" by monitoring count-down by the counter 2-3 (step S73 to step S75). Namely, when the ODD section executes one step (step S73), the MPU monitoring section 2-4 decrements the number of steps n by one (step S74) and makes determination as to whether the number of steps n has reached "0" or not (step S75). Then, the MPU monitoring section 2-4 validates, when checking of n=0 from the number of steps n in the counter 2-3 (step S75), an interruption from the ODC section (step S76).

At the point of time, in step S60, interruption control is input into the MPU 2 from the MPU monitoring section 2-4, and an interruption by the ODC section is validated according to the interruption control in step S61. Then, the processing returns to step S51. It is assumed herein that checking of this interruption control is executed by means of interruption without issuing of the command from the host computer.

When the next command is issued from the host computer (step S51), interruption according to the issued command is validated (step S52), and further the next command is validated as the current command (step S53), so that the drive processing is executed according to the current command and at the same time the next command is invalidated (step S62). For this reason, even if the next command issued from the host computer is valid, the current command is invalidated in step S53.

Namely, when it is determined in step S54 that drive control is being provided, as described above, the processing for drive control is not executed according to the current command but is executed according to the command issued after the count-down of the number of steps n giving interruption invalid time is over.

As described above, with Embodiment 3, processing steps from generation of a previous interruption from the host computer are counted, and the next interruption is invalidated by hardware until the number of counted steps is over a specified number of steps. For this reason, the driving operation can further be continued until the next interruption is validated, so that it is possible to prevent generation of abnormal termination of the operation for drive control or the like.

A specified number of steps may arbitrarily be specified from the host computer, and in this case it is possible to insure a minimum period of time required for realizing a smooth driving operation. The specified number of steps may also variably be specified according to any one of a recording density in a medium, a head position, contents of an instruction from the host computer, and a command operation, or to combination of two or more thereof, and in this case it is possible to more dynamically insure a driving operation.

In Embodiment 3, as the driving operation is basically insured when the medium is accessed, specification of n-steps may be limited to a read system, a write system, a seek system, and to a format system, and the n-steps may be set to zero for any other commands.

Also, in Embodiment 3, when the write caching is being executed, there is a high possibility that commands from the upper host computer may come frequently during the processing, so that, although the n-steps should desirably be a maximum value of the number of blocks which are executed, the maximum value may be obtained by the following expression (2) taking time-out of the host computer into consideration.

$$(\text{Time-out period} - \text{Margin}) > (\text{Processing blocks} \times \text{Processing time for each medium}) \quad (2)$$

Further, in consideration of command execution efficiency of the host computer, a maximum value is set to max, and n-steps may dynamically be specified for the rest of the values according to an effective transfer rate of the host computer. Practically, the processing rate in the host computer is far more speedy, so that specified n may be a minimum.

In the invention, like in Embodiment 4 described as follows, an ODD operation and a transfer rate between the host computer and the optical disk unit via the RAM 7 as a data buffer may be insured more efficiently, and in this case, interruption controls are also executed. It should be noted that any of the configuration according to Embodiments 1 to 3 may be applicable. Namely, when validation or invalidation of an interruption is to be controlled by software, the MPU 2 (Refer to FIG. 1) may be used like in Embodiment 1, and also when validation or invalidation of an interruption is to be controlled through hardware, the interruption control section 2-2 (Refer to FIG. 7) or MPU monitoring section 2-4 (Refer to FIG. 10) may be used like in Embodiment 2 or Embodiment 3.

In Embodiment 4, when data is to be written in an optical disk as a medium from the upper host computer, the data to be written is temporarily saved in the RAM 7. For this operation, in order to validate or invalidate an operation for interruption control, an interruption valid period is set, and any other period is set to be an interruption invalid period in Embodiment 4.

To obtain the interruption valid period BN, at first, to check how many blocks of data stored in the RAM 7 the upper host computer can transfer without delay, a ratio M using a first transfer rate rt1 by the host computer, a second transfer rate rt2 by the optical disk unit and a data volume DT in the RAM 7 is obtained through the following expression (3).

$$M = (rt1/rt2)/DT \quad (3)$$

Further, the number of blocks for making an interruption validated, namely an interruption validated period BN can be obtained through the following expression (4) using the ratio M and the number of commands CN in the RAM 7.

$$BN = M/CN \quad (4)$$

As an interruption from the host computer is invalidated after the interruption valid period has passed, the driving operation can preferentially be executed excluding a case where an interruption is permitted for caching a specified volume to the data buffer. With this feature, it is possible to smoothly execute a writing operation in a medium in a memory apparatus.

The ratio M for deciding an interruption valid period BN may arbitrarily be specified from the host computer, and in this case it is possible to insure a minimum period of time required for realizing a smooth driving operation. Also, because each loaded optical disk has a different transfer rate, if the ratio M is dynamically changed in each optical disk, the transfer efficiency can be provided with higher reliability.

Further, if the ratio M is dynamically changed according to a time for moving of the head, the ODD operation can be insured with higher reliability. Also, if the ratio M is dynamically changed according to the processed command operation namely the number of blocks to be processed, the transfer efficiency can be insured with high reliability.

In Embodiments 1 to 3, description was made for the smooth driving operation when synchronizing to a command with the host computer, but in this invention, as in Embodiment 5 described below, a smooth driving operation may be realized even when not synchronizing to a command with the host computer.

When the configuration according to Embodiment 1 is applied, for example, at the time of processing for loading an optical disk in a memory apparatus, time from generation of a previous interruption by the host computer is measured, and the next interruption may be invalidated by a processor until the measured time is over a prespecified period of time. In this case, the driving operation can further be continued until the next interruption is validated, which makes it possible to prevent generation of abnormal termination of the driving control operation or the like even when not synchronizing to a command with the host computer.

Also, when the configuration according to Embodiment 2 is applied, at the time of processing for loading an optical disk in the memory apparatus, time from generation of a previous interruption by the host computer is measured, and the next interruption may be invalidated by hardware until the measured time is over the prespecified period of time. In this case, the driving operation can further be continued as well until the next interruption is validated, which makes it possible to prevent generation of abnormal termination of the operation for driving control or the like even when not synchronizing to a command with the host computer.

When the configuration according to Embodiment 1 or 2 is applied, a prespecified period of time may arbitrarily be specified from the host computer, and in this case it is possible to insure a minimum period of time required for realizing a smooth driving operation. Further, the prespecified period of time may variably be specified according to any one of a recording density in an optical disk, a head position, and contents of an instruction from the host computer, or to combination of two or more thereof, and in this case it is possible to more dynamically insure a driving operation.

Also, when the configuration according to Embodiment 3 is applied, processing steps from generation of a previous interruption from the host computer are counted, and the next interruption is invalidated by hardware until the number of counted steps is over a specified number of steps. In this case, the driving operation can further be continued until the next interruption is validated, which makes it possible to prevent generation of abnormal termination of the driving operation or the like even when not synchronizing to a command with the host computer.

Then, a specified number of steps may arbitrarily be specified from the host computer, and in this case, it is possible to insure a minimum period of time required for realizing a smooth driving operation. Further, the specified number of steps may also variably be specified according to any one of a recording density in a medium, a head position, contents of an instruction from the host computer, and a command operation, or to combination of two or more thereof, and in this case it is possible to more dynamically insure a driving operation.

Description of an optical disk unit according to Embodiments 1 to 5 above assumed use of the readable/writable magneto-optic disk unit, but the present invention is applicable to any other optical disk units such as an optical disk unit that can only read.

The present invention was described above with reference to Embodiments 1 to 5, and it is to be understood that changes and variations may be made without departing from the spirit and scope of the invention as claimed described below, and it is therefore clear that those changes and variations are not to be excluded from the scope of the invention.

As described above, with the drive control unit according to the present invention, time measurement is started when a previous interruption from an upper system is generated, and the next interruption is invalidated by a processor until the measured time is over a prespecified period of time, so that the driving operation can further be proceeded until the next interruption is validated, and with those operations, it is possible to obtain a driving control unit which can prevent generation of abnormal termination of a driving operation or the like.

With the drive control unit according to the present invention, time measurement is started when a previous interruption from the upper system is generated, and the next interruption is invalidated by hardware until the measured time is over a prespecified period of time, so that the driving operation can further be proceeded until the next interruption is validated, and with those operations, it is possible to obtain a driving control unit which can prevent generation of abnormal termination of a driving operation or the like.

With the drive control unit according to the present invention, the prespecified period of time may arbitrarily be specified from the upper system, and in this case, it is possible to obtain a driving control unit which can insure a minimum period of time required for realizing a smooth driving operation.

With the drive control unit according to the present invention, the prespecified period of time may variably be specified according to any one of a recording density in a medium, a head position, and contents of an instruction from the upper system, or to combination of two or more thereof, and in this case it is possible obtain a driving control unit which can more dynamically insure a driving operation.

With the drive control unit according to the present invention, processing steps from generation of a previous interruption from the upper system are counted, and the next interruption is invalidated by hardware until the number of counted steps is over a specified number of steps, so that the driving operation can further be proceeded until the next interruption is validated, and with those operations, it is possible to obtain a driving control unit which can prevent generation of abnormal termination of a driving operation or the like.

With the drive control unit according to the present invention, the specified number of steps may arbitrarily be specified from the upper system, and in this case it is possible to obtain a driving control unit which can insure a minimum period of time required for realizing a smooth driving operation.

With the drive control unit according to the present invention, the specified number of steps may variably be specified according to any one of a recording density in a medium, a head position, contents of an instruction from the upper system, and a command operation, or to combination of two or more thereof, and in this case it is possible to obtain a driving control unit which can more dynamically insure a driving operation.

With the drive control unit according to the present invention, an interruption from the upper system is invalidated after the prespecified period is over according to a difference between a transfer rate by the upper system and a transfer rate in the device as well as to a data volume in the data buffer, so that priority can be given to the driving operation other than the interruption permitted for caching a specified volume to the data buffer, and with those operations, it is possible to obtain a driving control unit which can execute a smooth writing operation in a medium in a memory apparatus.

With drive control unit according to the present invention, the period may arbitrarily be specified from the upper system, and in this case, it is possible to obtain a driving control unit which can insure a minimum period of time required for realizing a smooth driving operation.

With the drive control unit according to the present invention, the period may variably be specified according to any one of a recording density in a medium, a head position, contents of an instruction from the upper system, and a command operation, or to combination of two or more thereof, and in this case it is possible to obtain a driving control unit which can more dynamically insure a driving operation and a transfer rate.

With the drive control unit according to the present invention, when a medium is inserted into the memory apparatus, time from generation of a previous interruption from the upper system is measured, and the next interruption is invalidated by the processor until the measured time is over a prespecified period of time, so that the driving operation can further be proceeded until the next interruption is validated, and with those operations it is possible to obtain a driving control unit which can prevent generation of abnormal termination of a driving operation or the like even when not synchronizing to a command from the upper system such as a host computer.

With the drive control unit according to the present invention, when a medium is inserted into the memory apparatus, time from generation of a previous interruption from the upper system is measured, and the next interruption is invalidated by the hardware until the measured time is over a prespecified period of time, so that the driving operation can further be continued until the next interruption is validated, and with those operations it is possible to obtain a driving control unit which can prevent generation of abnormal termination of a driving operation or the like even when not synchronizing to a command from the upper system such as a host computer.

With the drive control unit according to the present invention, the prespecified period of time may arbitrarily be specified from the upper system, and in this case, it is possible to obtain a driving control unit which can insure a minimum period of time required for realizing a smooth driving operation.

With the drive control unit according to the present invention, the prespecified period of time may variably be specified according to any one of a recording density in the medium, a head position, and contents of an instruction from the upper system, or to combination of two or more thereof, and in this case it is possible to obtain a driving control unit which can more dynamically insure a driving operation.

With the drive control unit according to the present invention, processing steps from generation of a previous interruption from the upper system are counted, and the next interruption is invalidated by hardware until the number of counted steps is over a specified number of steps, so that the driving operation can further be proceeded until the next interruption is validated, and with those operations, it is possible to obtain a driving control unit which can prevent generation of abnormal termination of a driving operation or the like even when not synchronizing to a command from the upper system such as a host computer.

With the drive control unit according to the present invention, the specified number of steps may arbitrarily be specified from the upper system, and in this case it is possible to obtain a driving control unit which can insure a minimum period of time required for realizing a smooth driving operation.

With the drive control unit according to the present invention, the specified number of steps may variably be specified according to any one of a recording density in a medium, a head position, contents of an instruction from the upper system, and a command operation, or to combination of two or more thereof, and in this case, it is possible to obtain a driving control unit which can more dynamically insure a driving operation.

With the optical memory apparatus according to the present invention, the next interruption from an ODC is invalidated by a MPU until the time from generation of a previous interruption from the upper system is over a prespecified period of time, so that the driving operation by a ODD can further be proceeded until the next interruption from the ODC is validated. With those operations, it is possible to obtain an optical memory apparatus which can prevent generation of abnormal termination of a driving operation or the like.

This application is based on Japanese patent application No. HEI 9-243182 filed in the Japanese Patent Office on Sep. 8, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A drive control unit connected to a host and controlling a memory apparatus according to instructions from said host, said drive control unit comprising:
    a first controller for generating interruptions according to said instructions from said host;
    a second controller for providing drive controls to said memory apparatus according to said interruptions by said first controller;
    a timer for measuring time; and
    a processor for starting said timer when said interruption by said first controller are executed, invalidating a present interruption when a measured time from a time point of generation of a said interruption which occurred prior to said present interruption until a time point of generation of said present interruption is not over a prespecified period of time, and validating, on the other hand, said present interruption when said measured time is over the prespecified period of time.

2. A drive control unit according to claim 1 wherein said first controller generates a said interruption according to an instruction from said host when a medium is inserted into said memory apparatus.

3. A drive control unit according to claim 1 wherein said prespecified period of time is arbitrarily specified from said host.

4. A drive control unit according to claim 1 wherein said prespecified period of time is variably specified according to any one of a recording density in a medium in said memory apparatus, a head position in said memory apparatus, and contents of an instruction from said host, or to combination of two or more thereof.

5. A drive control unit connected to a host and controlling a memory apparatus according to instructions from said host, said drive control unit comprising:
    a first controller for generating interruptions according to said instructions from said host;
    a second controller for providing drive controls to said memory apparatus according to said interruptions by said first controller;
    a timer for measuring time;
    a processor for starting said timer when said interruptions by said first controller are generated; and
    an interruption controller for invalidating a present interruption when a time period measured by said timer is not over a prespecified period of time, and validating the present interruption when the time period measured by said timer is over the prespecified period of time.

6. A drive control unit according to claim 5 wherein said first controller generates a said interruption according to an instruction from said host when a medium is inserted into said memory apparatus.

7. A drive control unit according to claim 5 wherein said prespecified period of time is arbitrarily specified from said host.

8. A drive control unit according to claim 5 wherein said prespecified period of time is variably specified according to any one of a recording density in a medium in said memory apparatus, a head position in said memory apparatus, and contents of an instruction from said host, or to combination of two or more thereof.

9. A drive control unit connected to a host controlling a memory apparatus according to instructions from said host, said drive control unit comprising:
    a first controller for generating interruptions according to said instructions from said host;
    a second controller for providing drive controls to said memory apparatus according to said interruptions by said first controller;
    a counter for counting steps;
    a processor for starting said counter when a present interruption is generated; and
    an interruption controller for invalidating said present interruption when the number of steps counted by said counter is not over a specified number of steps, and validating said present interruption when the number of steps counted by said counter is over said specified number of steps.

10. A driver control unit according to claim 9 wherein said first controller generates a said interruption according to a said instruction from said host when a medium is inserted into said memory apparatus.

11. A drive control unit according to claim 9 wherein said specified number of steps is arbitrarily specified from said host.

12. A drive control unit according to claim 9 wherein said specified number of steps is variably specified according to at least one of a recording density in a medium in said memory apparatus, a head position in said memory apparatus, contents of an instruction from said host, and a command operation, or to combination of two or more thereof.

13. A drive control unit connected to a host controlling a memory apparatus according to instructions from said host, said drive control unit comprising:

a data buffer for temporarily storing therein data output from said host; and an interruption controller for validating, when storing the data in said data buffer, a present interruption generated according to a said instruction from the host in a time period prespecified according to a difference between a transfer rate by said host and a transfer rate in the memory apparatus as well as to a data volume in said data buffer, and invalidating said present interruption when said specified time period has expired.

14. A drive control unit according to claim 13 wherein said time period is arbitrarily specified from said host.

15. A drive control unit according to claim 13 wherein said time period is variably specified according to any one of a recording density in a medium in said memory apparatus, a head position in said memory apparatus, contents of an instruction from said host, and a command operation, or to combination of two or more thereof.

16. An optical memory apparatus connected to a host and controlled according to instructions from said host, said optical memory apparatus comprising:

an optical disk controller (ODC) for generating interruptions according to said instructions from said host;

an optical disk driver (ODD) for providing drive controls to said optical memory apparatus according to said interruptions by said ODC; and a microprocessor unit (MPU) for, when said interruptions by said ODC are successively executed, invalidating a present interruption generated when a measured time from a time point of generation of a said interruption which occurs prior to said present interruption until a time point of generation of said present interruption is not over a prespecified period of time, and validating, on the other hand, said present interruption when said measured time is over the prespecified period of time.

17. A drive control unit connected to a host controlling a memory apparatus according to instructions from said host, said drive control unit comprising:

a first controller for generating interruptions according to said instructions from said host;

a second controller for providing drive controls to said memory apparatus according to said interruptions by said first controller;

a counter for counting processing steps by said second controller;

a processor for starting said timer when said interruptions by said first controller are generated; and an interruption controller for invalidating a present interruption when the number of steps counted by said counter is not over a specified number of steps, and validating said present interruption when the number of steps counted by said counter is over said specified number of steps.

18. A drive control unit according to claim 17 wherein said specified number of steps is arbitrarily specified from said host.

19. A drive control unit according to claim 17 wherein said specified number of steps is variably specified according to at least one of a recording density in a medium in said memory apparatus, a head position in said memory apparatus, contents of said instructions from said host, and a command operation, or to combination of two or more thereof.

20. A drive control unit connected to a host and controlling a memory apparatus according to instructions from said host, said drive control unit comprising:

a first controller for generating interruptions according to said instructions from said host;

a second controller for providing drive controls to said memory apparatus according to said interruptions by said first controller; and a processor for determining whether or not a present interruption is valid, and invalidating said present interruption if said present interruption is determined to be invalid.

21. A memory apparatus connected to a host and controlled according to instructions from said host, said memory apparatus comprising:

a first controller for generating interruptions according to said instructions from said host;

a second controller for providing drive controls to said memory apparatus according to said interruptions by said first controller; and a processor for determining whether or not a present interruption is valid, and invalidating said present interruption if said present interruption is determined to be invalid.

* * * * *

UNITED STATES PATENT AND TRADEMARK OFFICE
CERTIFICATE OF CORRECTION

PATENT NO. : 6,131,137
DATED : October 10, 2000
INVENTOR(S) : Yamakawa

It is certified that error appears in the above-identified patent and that said Letters Patent is hereby corrected as shown below:

Claim 1,
Line 10, delete "interruption" and insert "interruptions"

Signed and Sealed this

Thirtieth Day of October, 2001

Attest:

*Nicholas P. Godici*

NICHOLAS P. GODICI
*Attesting Officer*    *Acting Director of the United States Patent and Trademark Office*